(12) United States Patent
Chen et al.

(10) Patent No.: US 9,565,344 B2
(45) Date of Patent: Feb. 7, 2017

(54) OPTICAL IMAGING LENS AND ELECTRONIC DEVICE COMPRISING THE SAME

(71) Applicants: Shih-Han Chen, Taichung (TW);
Hung-Chien Hsieh, Taichung (TW);
Long Ye, Taichung (TW)

(72) Inventors: Shih-Han Chen, Taichung (TW);
Hung-Chien Hsieh, Taichung (TW);
Long Ye, Taichung (TW)

(73) Assignee: Genius Electronic Optical Co., Ltd., Taichung (TW)

( * ) Notice: Subject to any disclaimer, the term of this patent is extended or adjusted under 35 U.S.C. 154(b) by 68 days.

(21) Appl. No.: 14/279,345

(22) Filed: May 16, 2014

(65) Prior Publication Data
US 2015/0160435 A1 Jun. 11, 2015

(30) Foreign Application Priority Data

Dec. 10, 2013 (CN) .......................... 2013 1 0670474

(51) Int. Cl.
| | |
|---|---|
| *G02B 13/18* | (2006.01) |
| *H04N 5/225* | (2006.01) |
| *G02B 9/62* | (2006.01) |
| *G02B 13/00* | (2006.01) |

(52) U.S. Cl.
CPC ............ *H04N 5/2252* (2013.01); *G02B 9/62* (2013.01); *G02B 13/0045* (2013.01); *H04N 5/2254* (2013.01); *H04N 5/2257* (2013.01)

(58) Field of Classification Search
CPC ............ G02B 9/00; G02B 9/62; G02B 15/00; G02B 15/001; G02B 15/0015; G02B 15/002; G02B 15/0045; G02B 15/18
See application file for complete search history.

(56) References Cited

U.S. PATENT DOCUMENTS

| | | | |
|---|---|---|---|
| 7,480,105 | B2 | 1/2009 | Mori |
| 7,502,181 | B2 | 3/2009 | Shinohara |
| 7,663,814 | B2 | 2/2010 | Kitahara |
| 8,040,618 | B2 | 10/2011 | Kitahara |
| 8,355,215 | B2 | 1/2013 | Asami |
| 8,379,323 | B2 | 2/2013 | Huang |
| 8,385,006 | B2 | 2/2013 | Tsai |
| 8,432,619 | B2 | 4/2013 | Huang |

(Continued)

FOREIGN PATENT DOCUMENTS

| | | |
|---|---|---|
| TW | 201039622 | 11/2010 |
| TW | 201239446 | 10/2012 |

(Continued)

*Primary Examiner* — Thong Nguyen
(74) *Attorney, Agent, or Firm* — Winston Hsu; Scott Margo

(57) ABSTRACT

An optical imaging lens set includes a first lens element having an image-side surface with a convex part in a vicinity of its periphery, a second lens element with negative refractive power having an image-side surface with a concave part in a vicinity of the optical axis, a third lens element having an object-side surface with a concave part in a vicinity of the optical axis, a fourth lens element having an image-side surface with a convex part in a vicinity of the optical axis, a fifth lens element having an image-side surface with a concave part in a vicinity of the optical axis, and a sixth lens element having an image-side surface with a convex part in a vicinity of its periphery.

13 Claims, 25 Drawing Sheets

(56) References Cited

U.S. PATENT DOCUMENTS

| | | |
|---|---|---|
| 2010/0305405 A1 | 12/2010 | Miyano |
| 2012/0170142 A1 | 7/2012 | Hsieh |
| 2012/0188654 A1* | 7/2012 | Huang ............... G02B 9/62 |
| | | 359/713 |
| 2012/0194726 A1 | 8/2012 | Huang |
| 2012/0243108 A1* | 9/2012 | Tsai ............... G02B 13/18 |
| | | 359/713 |
| 2012/0314304 A1 | 12/2012 | Huang |
| 2014/0320981 A1* | 10/2014 | Hsieh ............ G02B 13/0045 |
| | | 359/713 |
| 2015/0042862 A1* | 2/2015 | Huang ............ H04N 5/2254 |
| | | 348/335 |

FOREIGN PATENT DOCUMENTS

| | | |
|---|---|---|
| TW | 201243386 | 11/2012 |
| TW | 201300824 | 1/2013 |
| TW | 201305596 A1 | 2/2013 |
| TW | 201312155 | 3/2013 |
| TW | 201317619 | 5/2013 |
| TW | 201326883 A1 | 7/2013 |
| TW | 201348735 | 12/2013 |
| WO | 2012086199 A1 | 6/2012 |

* cited by examiner

| First Example | | | | | | |
|---|---|---|---|---|---|---|
| F= 4.394 mm, HFOV= 35.070 deg., Fno= 2.40 | | | | | | |
| No. | | Curvature Radius | Ape. Stop Distance Lens Thickness Air Gap | Refractive Index | Abbe No. | Material | Focal Length |
| | Object | Infinite | Infinite | | | | |
| | Object | Infinite | 0.230 | | | | |
| 80 | Ape. Stop | Infinite | -0.180 | | | | |
| 11 | First Lens | 1.893 | 0.624 | 1.544 | 56.114 | Plastic | 2.922 |
| 12 | | -8.970 | 0.130 | | | | |
| 21 | Second Lens | 16.012 | 0.260 | 1.64 | 23.529 | Plastic | -4.572 |
| 22 | | 2.473 | 0.402 | | | | |
| 31 | Third Lens | -880.811 | 0.369 | 1.544 | 56.114 | Plastic | 24.662 |
| 32 | | -13.263 | 0.243 | | | | |
| 41 | Fourth Lens | -1.887 | 0.564 | 1.544 | 56.114 | Plastic | 3.818 |
| 42 | | -1.095 | 0.207 | | | | |
| 51 | Fifth Lens | 5.287 | 0.453 | 1.544 | 56.114 | Plastic | -3.553 |
| 52 | | 1.376 | 0.411 | | | | |
| 61 | Sixth Lens | 2.771 | 0.450 | 1.544 | 56.114 | Plastic | 62.67 |
| 62 | | 2.842 | 0.500 | | | | |
| 71 | IR Filter | Infinite | 0.300 | | | | |
| 72 | IR Filter -Image Plane | Infinite | 0.454 | | | | |
| | Image Plane | Infinite | | | | | |

FIG. 18

| No. | 11 | 12 | 21 | 22 | 31 | 32 |
|---|---|---|---|---|---|---|
| K | -1.25607E+01 | -1.45020E+02 | 9.46572E+00 | -2.28866E+01 | 4.12480E+05 | 4.37138E+01 |
| a4 | 2.06797E-01 | 2.43561E-02 | 7.07123E-02 | 2.10169E-01 | -3.15542E-02 | -2.94460E-02 |
| a6 | -2.09058E-01 | -4.79561E-02 | -8.02503E-02 | -1.95774E-01 | -3.24597E-02 | -3.81358E-03 |
| a8 | 1.33361E-01 | -5.53239E-02 | -4.62778E-02 | 8.61572E-02 | 3.00983E-02 | -3.75347E-03 |
| a10 | -3.16023E-02 | 3.07645E-02 | 3.75462E-02 | 2.39127E-02 | -1.52946E-02 | 7.26270E-03 |
| a12 | -2.29618E-03 | 1.84211E-02 | 3.36486E-02 | -1.30215E-02 | -7.13247E-04 | 3.53145E-04 |
| a14 | -5.30557E-02 | -2.65065E-02 | -5.05895E-03 | -1.51044E-02 | 2.15024E-03 | 2.01355E-04 |
| a16 | 3.08352E-02 | 7.79318E-03 | -6.29386E-03 | 1.32368E-02 | 3.36820E-03 | -2.81576E-05 |

| No. | 41 | 42 | 51 | 52 | 61 | 62 |
|---|---|---|---|---|---|---|
| K | -3.87110E+00 | -8.56617E-01 | -3.31737E+01 | -6.94181E+00 | 3.88879E-02 | 0.00000E+00 |
| a4 | -7.97616E-02 | 1.12218E-01 | -7.61525E-02 | -7.80624E-02 | -1.09017E-01 | -1.04884E-01 |
| a6 | 1.00540E-01 | -5.38134E-02 | 2.59294E-02 | 1.66762E-02 | 6.40077E-03 | 2.04987E-02 |
| a8 | -4.93952E-02 | 3.42234E-02 | -5.51439E-03 | -5.24789E-03 | 1.56613E-03 | -2.35326E-03 |
| a10 | 5.98186E-02 | 2.04036E-02 | -4.53300E-04 | 8.63225E-04 | -1.74178E-04 | 8.74876E-05 |
| a12 | -3.18229E-02 | -1.45004E-02 | 1.54165E-04 | -2.34835E-06 | -1.77006E-07 | 4.40728E-07 |
| a14 | 5.58975E-05 | 1.75176E-04 | 3.60299E-05 | -2.55999E-05 | 9.63864E-09 | 5.46949E-08 |
| a16 | 2.28037E-03 | 6.58707E-04 | -4.46740E-06 | 3.70863E-06 | 7.40276E-09 | 5.73096E-09 |

FIG. 19

| | Second Example | | | | | |
|---|---|---|---|---|---|---|
| \multicolumn{7}{|c|}{F= 4.506 mm, HFOV= 34.397 deg., Fno= 2.40} | | | | | | |

| No. | | Curvature Radius | Ape. Stop Distance Lens Thickness Air Gap | Refractive Index | Abbe No. | Material | Focal Length |
|---|---|---|---|---|---|---|---|
| | Object | Infinite | Infinite | | | | |
| | Object | Infinite | 0.230 | | | | |
| 80 | Ape. Stop | Infinite | -0.180 | | | | |
| 11 | First Lens | 1.840 | 0.662 | 1.544 | 56.114 | Plastic | 2.883 |
| 12 | | -9.498 | 0.113 | | | | |
| 21 | Second Lens | 14.407 | 0.260 | 1.64 | 23.529 | Plastic | -4.799 |
| 22 | | 2.529 | 0.531 | | | | |
| 31 | Third Lens | -6.926 | 0.323 | 1.544 | 56.114 | Plastic | 42.682 |
| 32 | | -5.427 | 0.173 | | | | |
| 41 | Fourth Lens | -2.055 | 0.569 | 1.544 | 56.114 | Plastic | 3.791 |
| 42 | | -1.132 | 0.100 | | | | |
| 51 | Fifth Lens | 6.581 | 0.616 | 1.544 | 56.114 | Plastic | -3.345 |
| 52 | | 1.382 | 0.404 | | | | |
| 61 | Sixth Lens | 2.862 | 0.450 | 1.544 | 56.114 | Plastic | 95.47 |
| 62 | | 2.861 | 0.500 | | | | |
| 71 | IR Filter | Infinite | 0.300 | | | | |
| 72 | IR Filter -Image Plane | Infinite | 0.443 | | | | |
| | Image Plane | Infinite | | | | | |

FIG. 20

| No. | 11 | 12 | 21 | 22 | 31 | 32 |
|---|---|---|---|---|---|---|
| K | -1.13727E+01 | -1.35634E+02 | -1.48163E+02 | -2.50600E+01 | 3.51534E+01 | 1.34127E+01 |
| a4 | 2.07019E-01 | 1.55160E-02 | 6.52235E-02 | 2.11963E-01 | -3.43862E-02 | -3.87289E-02 |
| a6 | -2.08846E-01 | -5.06313E-02 | -8.03187E-02 | -1.98208E-01 | -3.41031E-02 | -1.35511E-03 |
| a8 | 1.34953E-01 | -5.59467E-02 | -4.47010E-02 | 8.82582E-02 | 3.23991E-02 | -2.56879E-03 |
| a10 | -3.12201E-02 | 3.19037E-02 | 3.90425E-02 | 2.79948E-02 | -1.62171E-02 | 7.59223E-03 |
| a12 | -3.78197E-03 | 1.85211E-02 | 3.51991E-02 | -9.91223E-03 | -1.61987E-03 | 6.08471E-04 |
| a14 | -5.47225E-02 | -2.73656E-02 | -4.33871E-03 | -1.47085E-02 | 3.49106E-03 | 2.95986E-04 |
| a16 | 3.07520E-02 | 8.13544E-03 | -7.81740E-03 | 1.09481E-02 | 6.68266E-03 | 4.24250E-05 |
| No. | 41 | 42 | 51 | 52 | 61 | 62 |
| K | -4.02627E+00 | -8.40983E-01 | 5.84465E+00 | -6.27943E+00 | 5.01583E-03 | -4.53433E-02 |
| a4 | -7.64327E-02 | 1.05150E-01 | -9.56521E-02 | -7.52656E-02 | -1.09297E-01 | -1.08794E-01 |
| a6 | 9.95168E-02 | -5.05607E-02 | 2.91899E-02 | 1.68495E-02 | 6.61655E-03 | 2.13466E-02 |
| a8 | -4.96988E-02 | 3.54301E-02 | -4.63187E-03 | -5.21906E-03 | 1.60573E-03 | -2.27299E-03 |
| a10 | 6.00611E-02 | 2.04875E-02 | -3.95615E-04 | 8.64962E-04 | -1.69960E-04 | 8.83134E-05 |
| a12 | -3.16969E-02 | -1.45601E-02 | 1.31038E-04 | -4.98105E-06 | 1.24389E-07 | 1.44697E-07 |
| a14 | 4.19055E-05 | 1.39961E-04 | 2.82829E-05 | -2.58813E-05 | 1.53376E-08 | 5.80711E-10 |
| a16 | 2.16595E-03 | 6.51848E-04 | -4.89101E-06 | 3.60820E-06 | 1.19803E-09 | -2.75356E-09 |

FIG. 21

| Third Example | | | | | | |
|---|---|---|---|---|---|---|
| F= 4.385 mm, HFOV= 35.126 deg., Fno= 2.40 | | | | | | |
| No. | | Curvature Radius | Ape. Stop Distance Lens Thickness Air Gap | Refractive Index | Abbe No. | Material | Focal Length |
| | Object | Infinite | Infinite | | | | |
| | Object | Infinite | 0.230 | | | | |
| 80 | Ape. Stop | Infinite | -0.180 | | | | |
| 11 | First Lens | 1.854 | 0.826 | 1.544 | 56.114 | Plastic | 2.677 |
| 12 | | -5.822 | 0.037 | | | | |
| 21 | Second Lens | 8.276 | 0.229 | 1.64 | 23.529 | Plastic | -4.072 |
| 22 | | 1.971 | 0.390 | | | | |
| 31 | Third Lens | -817.996 | 0.373 | 1.544 | 56.114 | Plastic | 15.019 |
| 32 | | -8.119 | 0.327 | | | | |
| 41 | Fourth Lens | -1.833 | 0.559 | 1.544 | 56.114 | Plastic | 3.689 |
| 42 | | -1.063 | 0.086 | | | | |
| 51 | Fifth Lens | -34.842 | 0.686 | 1.544 | 56.114 | Plastic | -2.55 |
| 52 | | 1.461 | 0.177 | | | | |
| 61 | Sixth Lens | 2.492 | 0.676 | 1.544 | 56.114 | Plastic | 19.766 |
| 62 | | 2.930 | 0.500 | | | | |
| 71 | IR Filter | Infinite | 0.300 | | | | |
| 72 | IR Filter -Image Plane | Infinite | 0.253 | | | | |
| | Image Plane | Infinite | | | | | |

FIG. 22

| No. | 11 | 12 | 21 | 22 | 31 | 32 |
|---|---|---|---|---|---|---|
| K | -1.20775E+01 | -1.17962E+02 | -3.10043E+02 | -1.85829E+01 | -1.15219E+21 | 2.43275E+01 |
| a4 | 2.10269E-01 | 2.78050E-02 | 7.20687E-02 | 1.73078E-01 | -5.46955E-02 | -3.27922E-02 |
| a6 | -2.01057E-01 | -4.63171E-02 | -7.79460E-02 | -1.65636E-01 | -2.46864E-02 | -1.05142E-02 |
| a8 | 1.30409E-01 | -6.00574E-02 | -4.52784E-02 | 8.76523E-02 | 1.80658E-02 | 6.31830E-04 |
| a10 | -2.64981E-02 | 3.45812E-02 | 3.17532E-02 | 8.31817E-03 | -1.61669E-02 | 5.54482E-03 |
| a12 | 4.03117E-03 | 2.37328E-02 | 2.44849E-02 | -2.02815E-02 | 1.83793E-03 | 3.53256E-03 |
| a14 | -4.88776E-02 | -2.36633E-02 | -7.91416E-03 | -8.07165E-03 | 7.84989E-03 | 8.51886E-04 |
| a16 | 2.89848E-02 | 4.90195E-03 | -1.56774E-03 | 1.56175E-02 | 7.04592E-03 | 4.38118E-04 |
| No. | 41 | 42 | 51 | 52 | 61 | 62 |
| K | -4.62363E+00 | -8.90470E-01 | 0.00000E+00 | -6.45311E+00 | -4.08172E-02 | 0.00000E+00 |
| a4 | -8.50214E-02 | 1.21672E-01 | -6.54707E-02 | -7.40827E-02 | -1.05419E-01 | -8.78822E-02 |
| a6 | 9.38095E-02 | -5.88673E-02 | 2.47228E-02 | 1.45688E-02 | 4.53330E-03 | 1.88079E-02 |
| a8 | -4.66090E-02 | 3.67292E-02 | -6.78190E-03 | -5.55456E-03 | 1.77703E-03 | -2.39079E-03 |
| a10 | 6.14788E-02 | 1.91662E-02 | -5.49375E-04 | 1.00676E-03 | -2.03423E-04 | 1.05855E-04 |
| a12 | -3.25846E-02 | -1.45292E-02 | 1.79387E-04 | 8.50685E-06 | -7.36937E-06 | 3.45910E-07 |
| a14 | 1.04808E-04 | 1.79788E-04 | 1.56956E-05 | -2.86912E-05 | 1.72087E-06 | 1.36271E-07 |
| a16 | 2.18181E-03 | 6.70664E-04 | 1.01182E-05 | 3.26970E-06 | -1.47586E-07 | -2.98815E-08 |

FIG. 23

| Fourth Example ||||||||
|---|---|---|---|---|---|---|---|
| F= 4.253 mm, HFOV= 36.195 deg., Fno= 2.40 ||||||||
| No. | | Curvature Radius | Ape. Stop Distance Lens Thickness Air Gap | Refractive Index | Abbe No. | Material | Focal Length |
| | Object | Infinite | Infinite | | | | |
| | Object | Infinite | 0.230 | | | | |
| 80 | Ape. Stop | Infinite | -0.180 | | | | |
| 11 | First Lens | 1.939 | 0.748 | 1.544 | 56.114 | Plastic | 2.802 |
| 12 | | -6.264 | 0.081 | | | | |
| 21 | Second Lens | 697.217 | 0.208 | 1.64 | 23.529 | Plastic | -4.21 |
| 22 | | 2.703 | 0.442 | | | | |
| 31 | Third Lens | -39.670 | 0.460 | 1.544 | 56.114 | Plastic | 14.665 |
| 32 | | -6.689 | 0.413 | | | | |
| 41 | Fourth Lens | -1.472 | 0.393 | 1.544 | 56.114 | Plastic | 5.282 |
| 42 | | -1.066 | 0.206 | | | | |
| 51 | Fifth Lens | 4.273 | 0.535 | 1.544 | 56.114 | Plastic | -6.447 |
| 52 | | 1.845 | 0.280 | | | | |
| 61 | Sixth Lens | 4.400 | 0.534 | 1.544 | 56.114 | Plastic | -10.936 |
| 62 | | 2.424 | 0.210 | | | | |
| 71 | IR Filter | Infinite | 0.300 | | | | |
| 72 | IR Filter -Image Plane | Infinite | 0.552 | | | | |
| | Image Plane | Infinite | | | | | |

| No. | 11 | 12 | 21 | 22 | 31 | 32 |
|---|---|---|---|---|---|---|
| K | -1.25538E+01 | -7.32036E+01 | -1.34800E+05 | -2.72714E+01 | 1.10941E+03 | 2.28383E+01 |
| a4 | 1.91913E-01 | 2.54493E-02 | 6.52086E-02 | 1.62364E-01 | -9.03559E-02 | -7.03976E-02 |
| a6 | -2.00724E-01 | -7.17501E-02 | -7.19606E-02 | -1.53688E-01 | -1.77236E-02 | -3.19475E-03 |
| a8 | 1.39141E-01 | -4.31140E-02 | -3.61229E-02 | 8.76264E-02 | 8.77237E-03 | -5.32226E-03 |
| a10 | -3.35568E-02 | 4.62775E-02 | 5.32961E-02 | 2.06140E-02 | -2.36907E-02 | 6.48973E-03 |
| a12 | -7.85856E-03 | 3.12605E-02 | 3.58646E-02 | -1.07326E-02 | 7.07527E-03 | 2.89752E-04 |
| a14 | -5.91684E-02 | -2.81730E-02 | -1.36950E-02 | -7.92164E-03 | 1.13654E-02 | 3.64789E-04 |
| a16 | 4.64856E-02 | -1.00904E-02 | -1.98011E-02 | 2.99693E-03 | 4.37969E-03 | 4.63741E-04 |
| No. | 41 | 42 | 51 | 52 | 61 | 62 |
| K | -4.84620E+00 | -7.95052E-01 | 3.55612E+00 | -9.45826E+00 | 4.20135E-01 | -3.77533E-01 |
| a4 | -1.44886E-01 | 9.06944E-02 | -8.79601E-02 | -6.67519E-02 | -1.08393E-01 | -1.01082E-01 |
| a6 | 9.17687E-02 | -5.54512E-02 | 2.12038E-02 | 1.20066E-02 | 7.12307E-03 | 2.03262E-02 |
| a8 | -4.70521E-02 | 3.50477E-02 | -4.96368E-03 | -5.49918E-03 | 1.61530E-03 | -2.31007E-03 |
| a10 | 6.44132E-02 | 1.98192E-02 | -4.25557E-04 | 9.01385E-04 | -1.73185E-04 | 8.90183E-05 |
| a12 | -3.13462E-02 | -1.46107E-02 | 1.08626E-04 | 5.45137E-06 | -1.38255E-06 | -4.86566E-07 |
| a14 | 3.86016E-05 | 2.91841E-04 | 2.47550E-05 | -2.43570E-05 | 2.00949E-07 | -4.93221E-08 |
| a16 | 1.87511E-03 | 6.87085E-04 | -4.99874E-06 | 3.64032E-06 | 9.76452E-08 | 3.26145E-09 |

| \multicolumn{7}{c}{Fifth Example} |
|||||||
| \multicolumn{7}{c}{F= 4.240 mm, HFOV= 36.317 deg., Fno= 2.40} |
|||||||

| No. | | Curvature Radius | Ape. Stop Distance Lens Thickness Air Gap | Refractive Index | Abbe No. | Material | Focal Length |
|---|---|---|---|---|---|---|---|
| | Object | Infinite | Infinite | | | | |
| | Object | Infinite | 0.230 | | | | |
| 80 | Ape. Stop | Infinite | -0.180 | | | | |
| 11 | First Lens | 1.929 | 0.727 | 1.544 | 56.114 | Plastic | 2.838 |
| 12 | | -6.823 | 0.088 | | | | |
| 21 | Second Lens | 47.531 | 0.208 | 1.64 | 23.529 | Plastic | -4.257 |
| 22 | | 2.590 | 0.423 | | | | |
| 31 | Third Lens | -46.531 | 0.479 | 1.544 | 56.114 | Plastic | 12.999 |
| 32 | | -6.180 | 0.503 | | | | |
| 41 | Fourth Lens | -1.496 | 0.392 | 1.544 | 56.114 | Plastic | 5.001 |
| 42 | | -1.056 | 0.105 | | | | |
| 51 | Fifth Lens | 4.361 | 0.567 | 1.544 | 56.114 | Plastic | -5.521 |
| 52 | | 1.700 | 0.286 | | | | |
| 61 | Sixth Lens | 3.886 | 0.557 | 1.544 | 56.114 | Plastic | -12.332 |
| 62 | | 2.339 | 0.500 | | | | |
| 71 | IR Filter | Infinite | 0.300 | | | | |
| 72 | IR Filter -Image Plane | Infinite | 0.227 | | | | |
| | Image Plane | Infinite | | | | | |

FIG. 26

| No. | 11 | 12 | 21 | 22 | 31 | 32 |
|---|---|---|---|---|---|---|
| K | -1.21077E+01 | -6.65508E+01 | -6.74606E+03 | -2.55894E+01 | 1.15211E+03 | 2.16193E+01 |
| a4 | 1.89707E-01 | 2.81194E-02 | 6.12637E-02 | 1.66450E-01 | -8.48514E-02 | -6.85888E-02 |
| a6 | -1.98928E-01 | -6.85996E-02 | -6.94993E-02 | -1.65679E-01 | -1.03754E-02 | 4.93122E-03 |
| a8 | 1.41355E-01 | -5.30647E-02 | -3.49991E-02 | 1.01404E-01 | 5.61375E-03 | -6.17479E-03 |
| a10 | -3.56610E-02 | 5.01010E-02 | 5.03146E-02 | 2.03448E-02 | -2.41955E-02 | 6.44825E-03 |
| a12 | -1.21427E-02 | 3.44756E-02 | 3.87912E-02 | -1.44656E-02 | 1.04213E-02 | -4.15396E-04 |
| a14 | -5.70191E-02 | -2.52604E-02 | -1.31797E-02 | -1.12235E-02 | 1.41741E-02 | 1.01035E-04 |
| a16 | 4.72875E-02 | -1.51658E-02 | -2.11150E-02 | 5.96424E-03 | -4.48943E-04 | 9.04624E-04 |
| No. | 41 | 42 | 51 | 52 | 61 | 62 |
| K | -4.45540E+00 | -7.68972E-01 | 3.77968E+00 | -8.54013E+00 | 3.17813E-01 | -4.79541E-01 |
| a4 | -1.59927E-01 | 8.95324E-02 | -8.46071E-02 | -6.47028E-02 | -1.11810E-01 | -1.06124E-01 |
| a6 | 8.85445E-02 | -5.84103E-02 | 2.01878E-02 | 1.16726E-02 | 7.54403E-03 | 2.17755E-02 |
| a8 | -4.46793E-02 | 3.43759E-02 | -4.90375E-03 | -5.60419E-03 | 1.65263E-03 | -2.40817E-03 |
| a10 | 6.30847E-02 | 2.03849E-02 | -4.45036E-04 | 9.10540E-04 | -1.87027E-04 | 8.64845E-05 |
| a12 | -3.08829E-02 | -1.44698E-02 | 9.70701E-05 | 1.14353E-05 | -2.50910E-06 | -1.88421E-07 |
| a14 | -2.08670E-05 | 2.20329E-04 | 2.35196E-05 | -2.43102E-05 | 5.35096E-08 | -3.37987E-08 |
| a16 | 1.86665E-03 | 6.90168E-04 | -4.20009E-06 | 3.25020E-06 | 1.19137E-07 | 6.55371E-09 |

FIG. 27

| \multicolumn{7}{|c|}{Sixth Example} |
|---|---|---|---|---|---|---|
| \multicolumn{7}{|c|}{F= 4.243 mm, HFOV= 36.194 deg., Fno= 2.40} |
| No. | | Curvature Radius | Ape. Stop Distance Lens Thickness Air Gap | Refractive Index | Abbe No. | Material | Focal Length |
| | Object | Infinite | Infinite | | | | |
| | Object | Infinite | 0.230 | | | | |
| 80 | Ape. Stop | Infinite | -0.180 | | | | |
| 11 | First Lens | 1.894 | 0.696 | 1.544 | 56.114 | Plastic | 2.799 |
| 12 | | -6.882 | 0.084 | | | | |
| 21 | Second Lens | 36.405 | 0.207 | 1.64 | 23.529 | Plastic | -4.212 |
| 22 | | 2.521 | 0.459 | | | | |
| 31 | Third Lens | -25.220 | 0.381 | 1.544 | 56.114 | Plastic | 15.432 |
| 32 | | -6.349 | 0.490 | | | | |
| 41 | Fourth Lens | -1.383 | 0.399 | 1.544 | 56.114 | Plastic | 5.174 |
| 42 | | -1.023 | 0.195 | | | | |
| 51 | Fifth Lens | 4.430 | 0.557 | 1.544 | 56.114 | Plastic | -5.058 |
| 52 | | 1.626 | 0.162 | | | | |
| 61 | Sixth Lens | 2.760 | 0.521 | 1.544 | 56.114 | Plastic | -39.758 |
| 62 | | 2.286 | 0.500 | | | | |
| 71 | IR Filter | Infinite | 0.300 | | | | |
| 72 | IR Filter -Image Plane | Infinite | 0.394 | | | | |
| | Image Plane | Infinite | | | | | |

FIG. 28

| No. | 11 | 12 | 21 | 22 | 31 | 32 |
|---|---|---|---|---|---|---|
| K | -1.18903E+01 | -8.25320E+01 | -3.94217E+03 | -2.39437E+01 | 4.47685E+02 | 2.29910E+01 |
| a4 | 1.93131E-01 | 2.73879E-02 | 6.63661E-02 | 1.70473E-01 | -9.24566E-02 | -6.42388E-02 |
| a6 | -1.98989E-01 | -6.71817E-02 | -6.62025E-02 | -1.65591E-01 | -2.43299E-02 | -7.53658E-03 |
| a8 | 1.39318E-01 | -5.33024E-02 | -3.65365E-02 | 1.02721E-01 | 9.22793E-03 | -3.59233E-03 |
| a10 | -3.74918E-02 | 4.74726E-02 | 4.71515E-02 | 2.13937E-02 | -2.08359E-02 | 8.46049E-03 |
| a12 | -1.29896E-02 | 3.08155E-02 | 3.78553E-02 | -1.55931E-02 | 1.08837E-02 | 5.66369E-04 |
| a14 | -5.68961E-02 | -2.71411E-02 | -1.14880E-02 | -1.25135E-02 | 1.45929E-02 | 5.01218E-04 |
| a16 | 4.78212E-02 | -1.05895E-02 | -1.97426E-02 | 7.56500E-03 | 1.95644E-03 | 8.82394E-04 |
| No. | 41 | 42 | 51 | 52 | 61 | 62 |
| K | -4.15380E+00 | -7.94509E-01 | 2.87397E+00 | -7.25825E+00 | 5.12490E-02 | -5.25998E-01 |
| a4 | -1.39188E-01 | 9.69129E-02 | -8.48361E-02 | -6.59706E-02 | -1.10130E-01 | -9.74847E-02 |
| a6 | 9.25011E-02 | -5.53907E-02 | 2.37785E-02 | 1.30419E-02 | 6.69119E-03 | 1.98828E-02 |
| a8 | -4.61090E-02 | 3.42375E-02 | -5.16369E-03 | -5.59955E-03 | 1.49350E-03 | -2.29283E-03 |
| a10 | 6.22537E-02 | 2.03444E-02 | -5.03832E-04 | 9.16796E-04 | -1.94978E-04 | 9.10574E-05 |
| a12 | -3.10151E-02 | -1.44976E-02 | 1.23159E-04 | 9.95365E-06 | -2.68007E-06 | -1.43029E-07 |
| a14 | 5.71370E-05 | 2.23568E-04 | 3.13728E-05 | -2.52242E-05 | 4.17377E-08 | -4.80499E-08 |
| a16 | 1.95078E-03 | 7.04047E-04 | -4.23602E-06 | 3.12223E-06 | 1.06950E-07 | 4.16574E-09 |

FIG. 29

| Seventh Example ||||||||
|---|---|---|---|---|---|---|---|
| F= 4.040 mm, HFOV= 37.366 deg., Fno= 2.40 ||||||||
| No. | | Curvature Radius | Ape. Stop Distance Lens Thickness Air Gap | Refractive Index | Abbe No. | Material | Focal Length |
| | Object | Infinite | Infinite | | | | |
| | Object | Infinite | 0.230 | | | | |
| 80 | Ape. Stop | Infinite | -0.130 | | | | |
| 11 | First Lens | 2.144 | 0.665 | 1.544 | 56.114 | Plastic | 3.182 |
| 12 | | -8.146 | 0.087 | | | | |
| 21 | Second Lens | 4.743 | 0.254 | 1.64 | 23.529 | Plastic | -6.886 |
| 22 | | 2.245 | 0.496 | | | | |
| 31 | Third Lens | -134.990 | 0.269 | 1.544 | 56.114 | Plastic | -8.497 |
| 32 | | 4.807 | 0.185 | | | | |
| 41 | Fourth Lens | -4.792 | 0.577 | 1.544 | 56.114 | Plastic | 2.685 |
| 42 | | -1.170 | 0.142 | | | | |
| 51 | Fifth Lens | 5.769 | 0.514 | 1.544 | 56.114 | Plastic | -4.091 |
| 52 | | 1.560 | 0.256 | | | | |
| 61 | Sixth Lens | 2.880 | 0.448 | 1.544 | 56.114 | Plastic | -39.669 |
| 62 | | 2.402 | 0.500 | | | | |
| 71 | IR Filter | Infinite | 0.300 | | | | |
| 72 | IR Filter -Image Plane | Infinite | 0.459 | | | | |
| | Image Plane | Infinite | | | | | |

FIG. 30

| No. | 11 | 12 | 21 | 22 | 31 | 32 |
|---|---|---|---|---|---|---|
| K | -1.60289E+01 | 1.61968E+01 | -8.42954E+00 | -1.35221E+01 | 1.09724E+01 | 0.00000E+00 |
| a4 | 1.67790E-01 | 1.25804E-02 | 2.41115E-02 | 1.29862E-01 | -1.92372E-01 | -1.84534E-01 |
| a6 | -1.88295E-01 | -7.16752E-02 | -4.07255E-02 | -1.08397E-01 | 5.50219E-02 | 4.93489E-02 |
| a8 | 1.08601E-01 | -2.77968E-02 | -5.69488E-02 | 5.19430E-02 | 6.26874E-02 | -3.27254E-03 |
| a10 | -4.16983E-02 | 3.09245E-02 | 4.74870E-02 | -1.66173E-02 | -4.73831E-02 | 3.35182E-03 |
| a12 | 1.50204E-02 | 1.10435E-02 | 1.44757E-02 | -4.07263E-04 | -3.97501E-03 | -2.27483E-03 |
| a14 | -4.76698E-02 | -2.80893E-02 | -1.37154E-02 | 7.26119E-03 | 1.81540E-02 | -2.57354E-03 |
| a16 | 2.21078E-02 | 6.92105E-03 | 2.07013E-03 | -3.03869E-03 | -9.22409E-03 | 1.29236E-03 |
| No. | 41 | 42 | 51 | 52 | 61 | 62 |
| K | -7.59431E+01 | -7.61948E-01 | 5.22238E+00 | -6.03502E+00 | -6.25760E-02 | -9.29881E-01 |
| a4 | -1.09534E-01 | 9.11740E-02 | -8.08783E-02 | -7.20046E-02 | -1.09798E-01 | -1.12573E-01 |
| a6 | 5.81490E-02 | -4.91420E-02 | 2.77872E-02 | 1.47721E-02 | 6.45020E-03 | 2.34008E-02 |
| a8 | -5.50628E-02 | 2.63731E-02 | -5.89405E-03 | -5.26361E-03 | 1.58277E-03 | -2.47687E-03 |
| a10 | 6.49408E-02 | 2.20496E-02 | -3.46482E-04 | 9.02535E-04 | -1.69102E-04 | 8.04657E-05 |
| a12 | -2.90664E-02 | -1.26999E-02 | 1.57846E-04 | -2.00165E-06 | 7.29324E-07 | 3.25507E-07 |
| a14 | 1.47571E-04 | 4.84950E-04 | 2.51263E-05 | -2.58619E-05 | 1.47684E-07 | 1.48039E-07 |
| a16 | 1.52519E-03 | 3.87557E-04 | -5.69249E-06 | 3.37910E-06 | -1.98822E-08 | -5.50024E-09 |

FIG. 31

|  | Example 1 | Example 2 | Example 3 | Example 4 | Example 5 | Example 6 | Example 7 |
|---|---|---|---|---|---|---|---|
| CT1 | 0.624 | 0.662 | 0.826 | 0.748 | 0.727 | 0.696 | 0.665 |
| AC12 | 0.13 | 0.113 | 0.037 | 0.081 | 0.088 | 0.084 | 0.087 |
| CT2 | 0.26 | 0.26 | 0.229 | 0.208 | 0.208 | 0.207 | 0.254 |
| AC23 | 0.402 | 0.531 | 0.39 | 0.442 | 0.423 | 0.459 | 0.496 |
| CT3 | 0.369 | 0.323 | 0.373 | 0.46 | 0.479 | 0.381 | 0.269 |
| AC34 | 0.243 | 0.173 | 0.327 | 0.413 | 0.503 | 0.49 | 0.185 |
| CT4 | 0.564 | 0.569 | 0.559 | 0.393 | 0.392 | 0.399 | 0.577 |
| AC45 | 0.207 | 0.1 | 0.086 | 0.206 | 0.105 | 0.195 | 0.142 |
| CT5 | 0.453 | 0.616 | 0.686 | 0.535 | 0.567 | 0.557 | 0.514 |
| AC56 | 0.411 | 0.404 | 0.177 | 0.28 | 0.286 | 0.162 | 0.256 |
| CT6 | 0.45 | 0.45 | 0.676 | 0.534 | 0.557 | 0.521 | 0.448 |
| ALT | 2.72 | 2.88 | 3.349 | 2.878 | 2.93 | 2.761 | 2.727 |
| AAG | 1.393 | 1.321 | 1.017 | 1.422 | 1.405 | 1.39 | 1.166 |
| AAG/(AC34+AC45) | 3.1 | 4.84 | 2.46 | 2.3 | 2.31 | 2.03 | 3.566 |
| (AC12−AC56)/CT5 | 1.19 | 0.84 | 0.31 | 0.67 | 0.66 | 0.44 | 0.667 |
| (AC12−AC56)/(AC34+AC45) | 1.2 | 1.89 | 0.52 | 0.58 | 0.62 | 0.36 | 1.049 |
| AC34/CT6 | 0.54 | 0.38 | 0.48 | 0.77 | 0.9 | 0.94 | 0.413 |
| ALT/CT3 | 7.37 | 8.92 | 8.98 | 6.26 | 6.12 | 7.25 | 10.138 |
| ALT/(AC12+AC56) | 5.03 | 5.57 | 15.65 | 7.97 | 7.83 | 11.22 | 7.950 |
| (AC23−AC45)/AC34 | 2.51 | 3.65 | 1.46 | 1.57 | 1.05 | 1.33 | 3.449 |
| CT5/CT3 | 1.23 | 1.91 | 1.84 | 1.16 | 1.18 | 1.46 | 1.911 |
| ALT/AAG | 1.95 | 2.18 | 3.29 | 2.02 | 2.09 | 1.99 | 2.339 |
| CT1/CT3 | 1.69 | 2.05 | 2.21 | 1.63 | 1.52 | 1.83 | 2.472 |

FIG. 32

OPTICAL IMAGING LENS AND ELECTRONIC DEVICE COMPRISING THE SAME

CROSS REFERENCE TO RELATED APPLICATION

This application claims priority to China Application No. 201310670474.2, filed on Dec. 10, 2013.

BACKGROUND OF THE INVENTION

1. Field of the Invention

The present invention generally relates to an optical imaging lens set and an electronic device which includes such optical imaging lens set. Specifically speaking, the present invention is directed to an optical imaging lens set with shorter length and an electronic device which includes such optical imaging lens set.

2. Description of the Prior Art

In recent years, the popularity of mobile phones and digital cameras makes the photography modules (including optical imaging lens set, holder and sensor, etc) well developed. Mobile phones and digital cameras become lighter and thinner, so that the miniaturization demands of photography modules get higher and higher. As the charge coupled device (CCD) or complementary metal-oxide semiconductor (CMOS) technologies advance, the size of the photography modules can be shrunk too, but these photography modules still need to maintain good imaging quality.

U.S. Pat. No. 8,355,215 disclosed an optical imaging lens set of six lens elements, and the total length of the optical imaging lens set is about 2 cm. Although the imaging quality is acceptable, the size of the optical imaging lens set is too long to be applied in electronic devices with only 1~2 cm thickness.

U.S. Pat. No. 8,432,619 disclosed an optical imaging lens set of six lens elements, and the total length of the optical imaging lens set can be reduced down to 0.5 cm. However, the distortion of the image is up to 25%. In other words, the imaging quality cannot satisfy the specification requirements of consumer electronics products.

SUMMARY OF THE INVENTION

In light of the above, the present invention proposes an optical imaging lens set that is lightweight, and has a low production cost, a reduced total length, a high resolution, and a high image quality. The optical imaging lens set of six lens elements of the present invention has a first lens element, a second lens element, a third lens element, a fourth lens element, a fifth lens element and a sixth lens element sequentially located from an object side to an image side along an optical axis.

The present invention provides an optical imaging lens set, from an object side toward an image side in order along an optical axis comprising: a first lens element, a second lens element, a third lens element, a fourth lens element, a fifth lens element and a sixth lens element, the first lens element having an image-side surface with a convex part in a vicinity of its periphery, the second lens element with negative refractive power, having an image-side surface with a concave part in a vicinity of the optical axis, the third lens element having an object-side surface with a concave part in a vicinity of the optical axis, the fourth lens having an image-side surface with a convex part in a vicinity of the optical axis, the fifth lens element having an image-side surface with a concave part in a vicinity of the optical axis, the sixth lens element being made of plastic, having an image-side surface with a convex part in a vicinity of its periphery, wherein the optical imaging lens set does not include any lens element with refractive power other than said first, second, third, fourth, fifth and sixth lens elements.

In the optical imaging lens set of six lens elements of the present invention, an air gap AC12 along the optical axis is disposed between the first lens element and the second lens element, an air gap AC23 along the optical axis is disposed between the second lens element and the third lens element, an air gap AC34 along the optical axis is disposed between the third lens element and the fourth lens element, an air gap AC45 along the optical axis is disposed between the fourth lens element and the fifth lens element, an air gap AC56 along the optical axis is disposed between the fifth lens element and the sixth lens element, and the sum of total five air gaps between adjacent lens elements from the first lens element to the sixth lens element along the optical axis is AAG, AAG=AC12+AC23+AC34+AC45+AC56.

In the optical imaging lens set of six lens elements of the present invention, the first lens element has a first lens element thickness CT1 along the optical axis, the second lens element has a second lens element thickness CT2 along the optical axis, the third lens element has a third lens element thickness CT3 along the optical axis, the fourth lens element has a fourth lens element thickness CT4 along the optical axis, the fifth lens element has a fifth lens element thickness CT5 along the optical axis, the sixth lens element has a sixth lens element thickness CT6 along the optical axis, and the total thickness of all the lens elements in the optical imaging lens set along the optical axis is ALT, ALT=CT1+CT2+CT3+CT4+CT5+CT6.

In the optical imaging lens set of six lens elements of the present invention, the relationship $$\frac{AAG}{AC34+AC45} \leq 5.6$$

is satisfied.

In the optical imaging lens set of six lens elements of the present invention, the relationship $$\frac{AC12+AC56}{CT5} \leq 1.50$$

is satisfied.

In the optical imaging lens set of six lens elements of the present invention, the image-side surface of the second lens element further comprises a concave part in a vicinity of its periphery.

In the optical imaging lens set of six lens elements of the present invention, the fifth lens element has negative refractive power.

In the optical imaging lens set of six lens elements of the present invention, the relationship $$\frac{AC12+AC56}{AC34+AC45} \leq 2.00$$

is satisfied.

In the optical imaging lens set of six lens elements of the present invention, the relationship $$\frac{AC34}{CT6} \leq 1.00$$

is satisfied.

In the optical imaging lens set of six lens elements of the present invention, the relationship $$6.00 \leq \frac{ALT}{CT3}$$

is satisfied.

In the optical imaging lens set of six lens elements of the present invention, the relationship $$4.50 \leq \frac{ALT}{AC12 + AC56}$$

is satisfied.

In the optical imaging lens set of six lens elements of the present invention, the relationship $$0.95 \leq \frac{AC23 + AC45}{AC34}$$

is satisfied.

In the optical imaging lens set of six lens elements of the present invention, the relationship $$1 \leq \frac{CT5}{CT3}$$

is satisfied.

In the optical imaging lens set of six lens elements of the present invention, the relationship $$2.00 \leq \frac{ALT}{AAG}$$

is satisfied.

In the optical imaging lens set of six lens elements of the present invention, the relationship $$1.30 \leq \frac{CT1}{CT3}$$

is satisfied.

In the optical imaging lens set of six lens elements of the present invention, the object-side surface of the second lens element further comprises a convex part in a vicinity of the optical axis.

In the optical imaging lens set of six lens elements of the present invention, the object-side surface of the second lens element further comprises a convex part in a vicinity of its periphery.

The present invention also proposes an electronic device which includes the optical imaging lens set as described above. The electronic device includes a case and an image module disposed in the case. The image module includes an optical imaging lens set as described above, a barrel for the installation of the optical imaging lens set, a module housing unit for the installation of the barrel, a substrate for the installation of the module housing unit, and an image sensor disposed on the substrate and at an image side of the optical imaging lens set.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 18 shows the optical data of the first example of the optical imaging lens set.

FIG. 19 shows the aspheric surface data of the first example.

FIG. 20 shows the optical data of the second example of the optical imaging lens set.

FIG. 21 shows the aspheric surface data of the second example.

FIG. 22 shows the optical data of the third example of the optical imaging lens set.

FIG. 23 shows the aspheric surface data of the third example.

FIG. 24 shows the optical data of the fourth example of the optical imaging lens set.

FIG. 25 shows the aspheric surface data of the fourth example.

FIG. 26 shows the optical data of the fifth example of the optical imaging lens set.

FIG. 27 shows the aspheric surface data of the fifth example.

FIG. 28 shows the optical data of the sixth example of the optical imaging lens set.

FIG. 29 shows the aspheric surface data of the sixth example.

FIG. 30 shows the optical data of the seventh example of the optical imaging lens set.

FIG. 31 shows the aspheric surface data of the seventh example.

FIG. 32 shows some important ratios in the examples.

DETAILED DESCRIPTION

Figure 15:
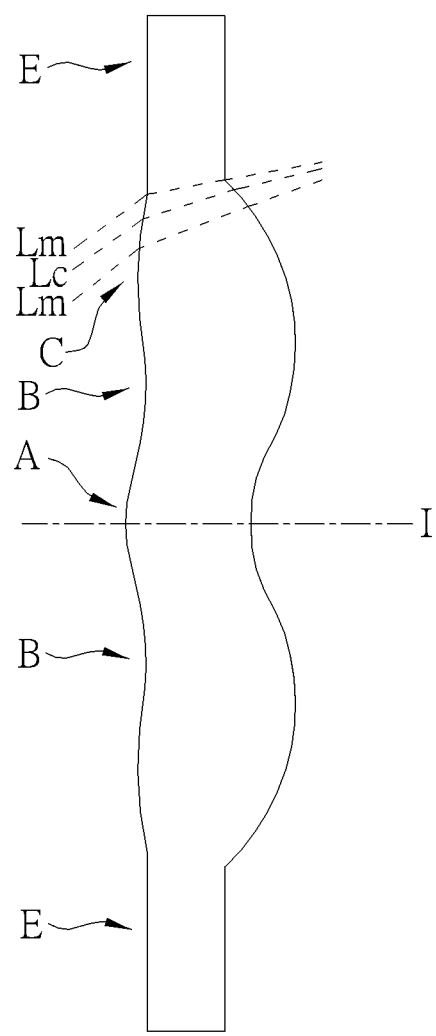
FIG. 15 illustrates exemplificative shapes of the optical imaging lens element of the present invention.

Before the detailed description of the present invention, the first thing to be noticed is that in the present invention, similar (not necessarily identical) elements are labeled as the same numeral references. In the entire present specification, "a certain lens element has negative/positive refractive power" refers to the part in a vicinity of the optical axis of the lens element has negative/positive refractive power. "An object-side/image-side surface of a certain lens element has a concave/convex part" refers to the part is more concave/convex in a direction parallel with the optical axis to be compared with an outer region next to the region. Taking FIG. 15 for example, the optical axis is "I" and the lens element is symmetrical with respect to the optical axis I. The object side of the lens element has a convex part in the region A, a concave part in the region B, and a convex part in the region C because region A is more convex in a direction parallel with the optical axis than an outer region (region B) next to region A, region B is more concave than region C and region C is similarly more convex than region E. "A circular periphery of a certain lens element" refers to a circular periphery region of a surface on the lens element for light to pass through, that is, region C in the drawing. In the drawing, imaging light includes Lc (chief ray) and Lm (marginal ray). "A vicinity of the optical axis" refers to an optical axis region of a surface on the lens element for light to pass through, that is, the region A in FIG. 15. In addition, the lens element may include an extension part E for the lens element to be installed in an optical imaging lens set. Ideally speaking, no light would pass through the extension part, and the actual structure and shape of the extension part is not limited to this and may have other variations. For the reason of simplicity, the extension part is not illustrated in FIGS. 1, 3, 5, 7, 9, 11 and 13.

Figure 1:
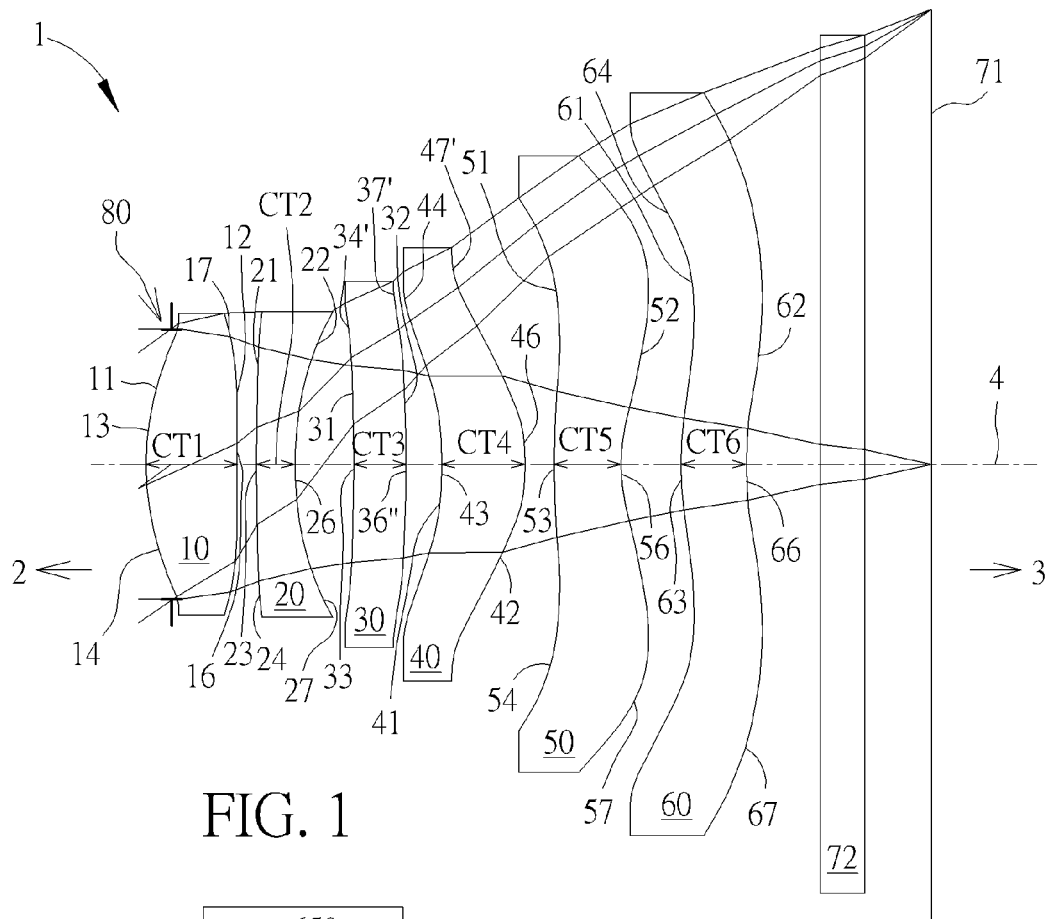
FIG. 1 illustrates a first example of the optical imaging lens set of the present invention.

As shown in FIG. 1, the optical imaging lens set 1 of six lens elements of the present invention, sequentially located from an object side 2 (where an object is located) to an image side 3 along an optical axis 4, has a first lens element 10, a second lens element 20, a third lens element 30, a fourth lens element 40, a fifth lens element 50, a sixth lens element 60, a filter 72 and an image plane 71. Generally speaking, the first lens element 10, the second lens element 20, the third lens element 30, the fourth lens element 40, the fifth lens element 50 and the sixth lens element 60 may be made of a transparent plastic material, but the present invention is not limited to this. There are exclusively six lens elements with refractive power in the optical imaging lens set 1 of the present invention. The optical axis 4 is the optical axis of the entire optical imaging lens set 1, and the optical axis of each of the lens elements coincides with the optical axis of the optical imaging lens set 1.

Furthermore, the optical imaging lens set 1 includes an aperture stop (ape. stop) 80 disposed in an appropriate position. In FIG. 1, the aperture stop 80 is disposed before the object-side surface of the first lens element 10. When light emitted or reflected by an object (not shown) which is located at the object side 2 enters the optical imaging lens set 1 of the present invention, it forms a clear and sharp image on the image plane 71 at the image side 3 after passing through the aperture stop 80, the first lens element 10, the second lens element 20, the third lens element 30, the fourth lens element 40, the fifth lens element 50, the sixth lens element 60 and the filter 72.

In the embodiments of the present invention, the optional filter 72 may be a filter of various suitable functions, for example, the filter 72 may be an infrared cut filter (IR cut filter), placed between the sixth lens element 60 and the image plane 71. The filter 72 is made of glass.

Each lens element in the optical imaging lens set 1 of the present invention has an object-side surface facing toward the object side 2 as well as an image-side surface facing toward the image side 3. In addition, each object-side surface and image-side surface in the optical imaging lens set 1 of the present invention has a part in a vicinity of its circular periphery (circular periphery part) away from the optical axis 4 as well as a part in a vicinity of the optical axis (optical axis part) close to the optical axis 4. For example, the first lens element 10 has a first object-side surface 11 and a first image-side surface 12; the second lens element 20 has a second object-side surface 21 and a second image-side surface 22; the third lens element 30 has a third object-side surface 31 and a third image-side surface 32; the fourth lens element 40 has a fourth object-side surface 41 and a fourth image-side surface 42; the fifth lens element 50 has a fifth object-side surface 51 and a fifth image-side surface 52; the sixth lens element 60 has a sixth object-side surface 61 and a sixth image-side surface 62.

Each lens element in the optical imaging lens set 1 of the present invention further has a central thickness CT on the optical axis 4. For example, the first lens element 10 has a first lens element thickness CT1, the second lens element 20 has a second lens element thickness CT2, the third lens element 30 has a third lens element thickness CT3, the fourth lens element 40 has a fourth lens element thickness CT4, the fifth lens element 50 has a fifth lens element thickness CT5, and the sixth lens element 60 has a sixth lens element thickness CT6. Therefore, the total thickness of all the lens elements in the optical imaging lens set 1 along the optical axis 4 is ALT, ALT=CT1+CT2+CT3+CT4+CT5+CT6.

In addition, between two adjacent lens elements in the optical imaging lens set 1 of the present invention there is an air gap AC along the optical axis 4. For example, an air gap AC12 is disposed between the first lens element 10 and the second lens element 20, an air gap AC23 is disposed between the second lens element 20 and the third lens element 30, an air gap AC34 is disposed between the third lens element 30 and the fourth lens element 40, an air gap AC45 is disposed between the fourth lens element 40 and the fifth lens element 50, and an air gap AC56 is disposed between the fifth lens element 50 and the sixth lens element 60. Therefore, the sum of total five air gaps between adjacent lens elements from the first lens element 10 to the sixth lens element 60 along the optical axis 4 is AAG, AAG=AC12+AC23+AC34+AC45+AC56.

First Example

Figures 2A, 2B, 2C, 2D:
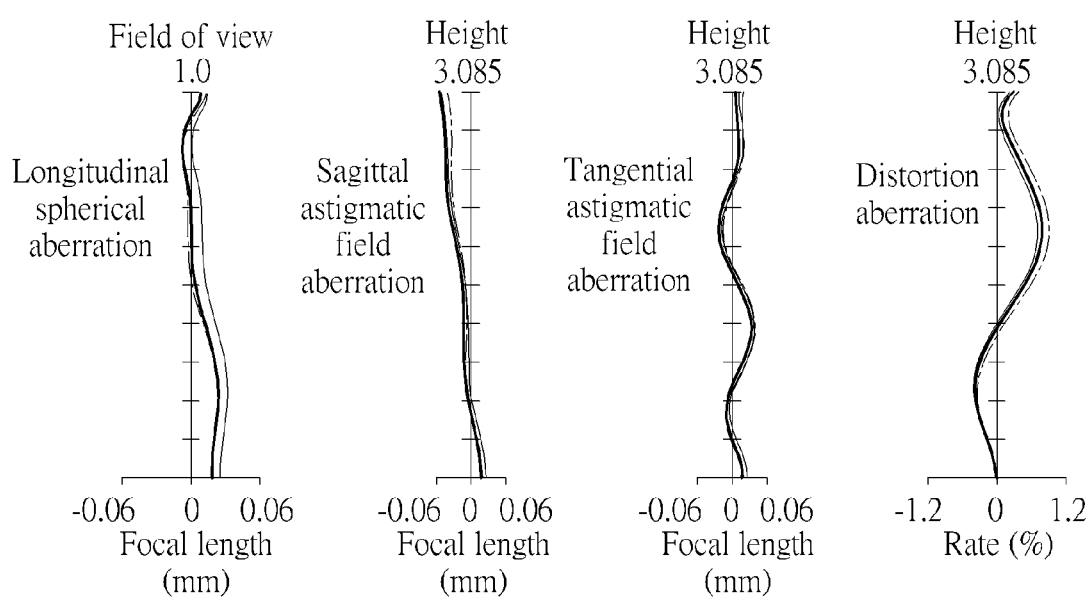
FIG. 2A illustrates the longitudinal spherical aberration on the image plane of the first example.
FIG. 2B illustrates the astigmatic aberration on the sagittal direction of the first example.
FIG. 2C illustrates the astigmatic aberration on the tangential direction of the first example.
FIG. 2D illustrates the distortion aberration of the first example.

Please refer to FIG. 1 which illustrates the first example of the optical imaging lens set 1 of the present invention. Please refer to FIG. 2A for the longitudinal spherical aberration on the image plane 71 of the first example; please refer to FIG. 2B for the astigmatic field aberration on the sagittal direction; please refer to FIG. 2C for the astigmatic field aberration on the tangential direction, and please refer to FIG. 2D for the distortion aberration. The Y axis of the spherical aberration in each example is "field of view" for 1.0. The Y axis of the astigmatic field and the distortion in each example stand for "image height". The image height is 3.085 mm.

The optical imaging lens set 1 of the first example has six lens elements 10 to 60; each is made of a plastic material and has refractive power. The optical imaging lens set 1 also has an aperture stop 80, a filter 72, and an image plane 71. The aperture stop 80 is provided before the first lens element 10. The filter 72 may be an infrared filter (IR cut filter) to prevent inevitable infrared light reaching the image plane to adversely affect the imaging quality.

The first lens element 10 has positive refractive power. The first object-side surface 11 facing toward the object side 2 is a convex surface, having a convex part 13 in the vicinity of the optical axis and a convex part 14 in a vicinity of its circular periphery; The first image-side surface 12 facing toward the image side 3 is a convex surface, having a convex part 16 in a vicinity of the optical axis and a concave part 17 in a vicinity of its circular periphery. Both the first object-side surface 11 and the first image-side 12 of the first lens element 10 are aspherical surfaces.

The second lens element 20 has negative refractive power. The second object-side surface 21 facing toward the object side 2 is a convex surface, having a convex part 23 in the vicinity of the optical axis and a convex part 24 in a vicinity of its circular periphery; The second image-side surface 22 facing toward the image side 3 is a concave surface, having a concave part 26 in the vicinity of the optical axis and a concave part 27 in a vicinity of its circular periphery. Both the second object-side surface 21 and the second image-side 22 of the second lens element 20 are aspherical surfaces.

The third lens element 30 has positive refractive power. The third object-side surface 31 facing toward the object side 2 is a concave surface, having a concave part 33 in the vicinity of the optical axis and a concave part 34' in a vicinity of its circular periphery; The third image-side surface 32 facing toward the image side 3 is a convex surface, having a convex part 36" in the vicinity of the optical axis and a convex part 37' in a vicinity of its circular periphery. Both the third object-side surface 31 and the third image-side 32 of the third lens element 30 are aspherical surfaces.

The fourth lens element 40 has positive refractive power. The fourth object-side surface 41 facing toward the object side 2 is a concave surface, having a concave part 43 in the vicinity of the optical axis and a concave part 44 in a vicinity of its circular periphery; The fourth image-side surface 42 facing toward the image side 3 is a convex surface, having a convex part 46 in the vicinity of the optical axis and a convex part 47' in a vicinity of its circular periphery. Both the fourth object-side surface 41 and the fourth image-side 42 of the fourth lens element 40 are aspherical surfaces.

The fifth lens element 50 has negative refractive power. The fifth object-side surface 51 facing toward the object side 2 has a convex part 53 in the vicinity of the optical axis and a concave part 54 in a vicinity of its circular periphery; The fifth image-side surface 52 facing toward the image side 3 has a concave part 56 in the vicinity of the optical axis and a convex part 57 in a vicinity of its circular periphery. Both the fifth object-side surface 51 and the fifth image-side 52 of the fifth lens element 50 are aspherical surfaces.

The sixth lens element 60 has positive refractive power. The sixth object-side surface 61 facing toward the object side 2 has a convex part 63 in the vicinity of the optical axis and a concave part 64 in a vicinity of its circular periphery; The sixth image-side surface 62 facing toward the image side 3 has a concave part 66 in the vicinity of the optical axis and a convex part 67 in a vicinity of its circular periphery. Both the sixth object-side surface 61 and the sixth image-side 62 of the sixth lens element 60 are aspherical surfaces. The filter 72 may be disposed between the fifth lens element 60 and the image plane 71.

It is worth noting that the imaging lens set of the present invention used here is a product of chip on board (COB) package, but not limited to.

In the optical imaging lens element 1 of the present invention, the object-side surfaces 11/21/31/41/51/61 and image-side surfaces 12/22/32/42/52/62 are all aspherical. These aspheric coefficients are defined according to the following formula:

$$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i}$$

In which:

R represents the curvature radius of the lens element surface;

Z represents the depth of an aspherical surface (the perpendicular distance between the point of the aspherical surface at a distance Y from the optical axis and the tangent plane of the vertex on the optical axis of the aspherical surface);

Y represents a vertical distance from a point on the aspherical surface to the optical axis;

K is a conic constant; $a_{2i}$ is the aspheric coefficient of the 2i order.

The optical data of the first example of the optical imaging lens set 1 are shown in FIG. 18 while the aspheric surface data are shown in FIG. 19. In the present examples of the optical imaging lens set, the f-number of the entire optical lens element system is Fno, HFOV stands for the half field of view which is half of the field of view of the entire optical lens element system, and the unit for the curvature radius, the thickness and the focal length is in millimeters (mm). The length of the optical imaging lens set (the distance from the first object-side surface 11 of the first lens element 10 to the image plane 71) is 5.367 mm. The image height is 3.085 mm. Some important ratios of the first example are as follows:

CT1=0.624
AC12=0.13
CT2=0.26
AC23=0.402
CT3=0.369
AC34=0.243
CT4=0.564
AC45=0.207
CT5=0.453
AC56=0.411
CT6=0.45
ALT=2.72
AAG=1.393
AAG/(AC34+AC45)=3.1
(AC12+AC56)/CT5=1.19
(AC12+AC56)/(AC34+AC45)=1.2
AC34/CT6=0.54
ALT/CT3=7.37
ALT/(AC12+AC56)=5.03
(AC23+AC45)/AC34=2.51
CT5/CT3=1.23
ALT/AAG=1.95
CT1/CT3=1.69

Second Example

Figure 3:
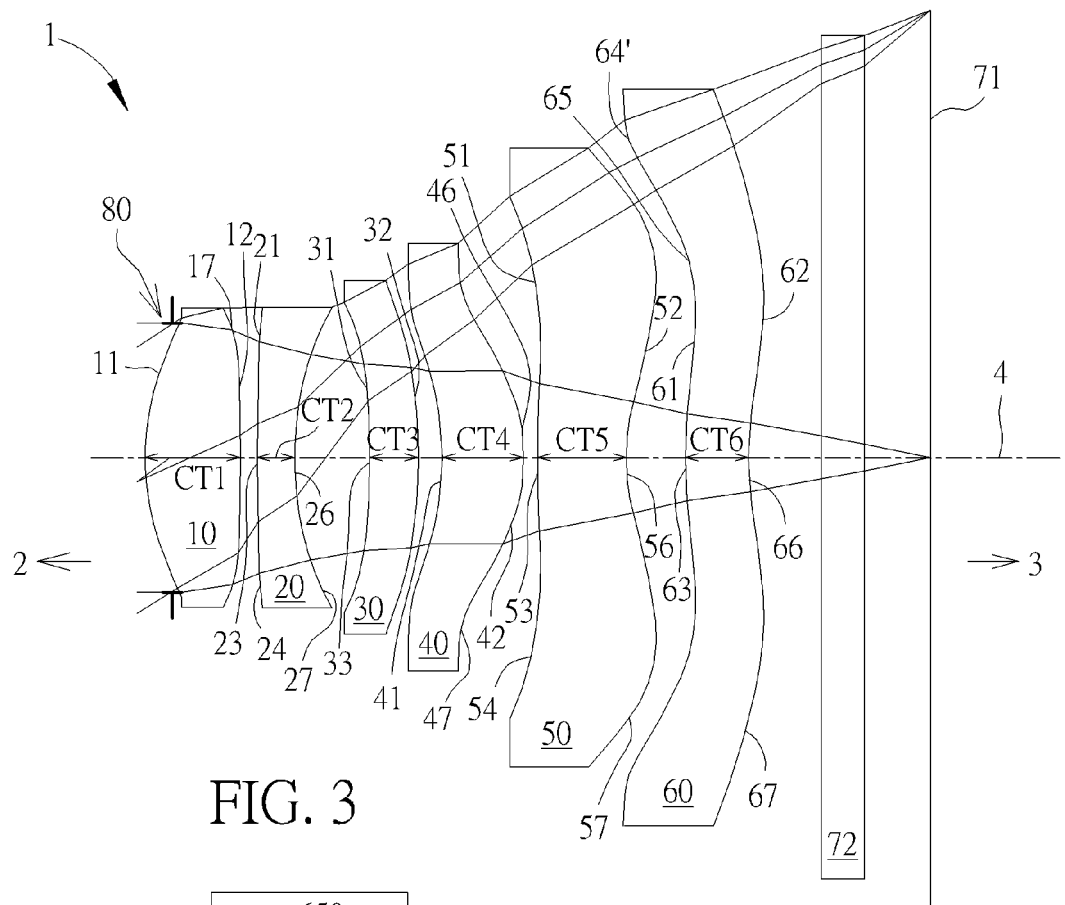
FIG. 3 illustrates a second example of the optical imaging lens set of six lens elements of the present invention.
Figures 4A, 4B, 4C, 4D:
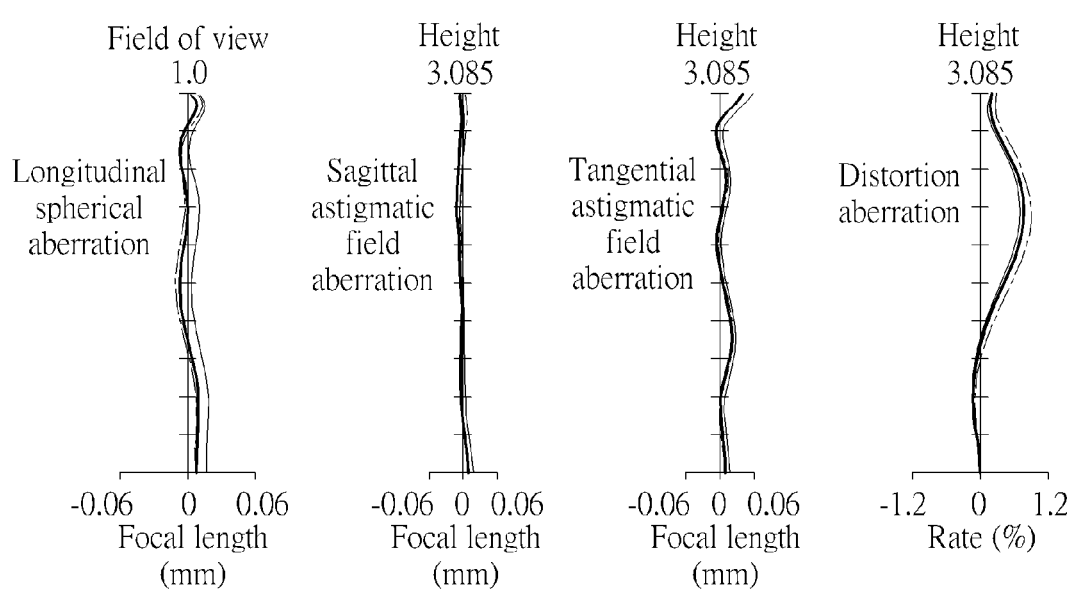
FIG. 4A illustrates the longitudinal spherical aberration on the image plane of the second example.
FIG. 4B illustrates the astigmatic aberration on the sagittal direction of the second example.
FIG. 4C illustrates the astigmatic aberration on the tangential direction of the second example.
FIG. 4D illustrates the distortion aberration of the second example.

Please refer to FIG. 3 which illustrates the second example of the optical imaging lens set 1 of the present invention. Please refer to FIG. 4A for the longitudinal spherical aberration on the image plane 71 of the second example; please refer to FIG. 4B for the astigmatic aberration on the sagittal direction; please refer to FIG. 4C for the astigmatic aberration on the tangential direction, and please refer to FIG. 4D for the distortion aberration. The components in the second example are similar to those in the first example, but the optical data such as the curvature radius, the refractive power, the lens thickness, the lens focal length, the aspheric surface or the back focal length in this example are different from the optical data in the first example, and in this example, the fourth image-side surface 42 of the fourth lens element 40 has a convex part 46 in the vicinity of the optical axis and a concave part 47 in a vicinity of its circular periphery, the sixth object-side surface 61 of the sixth lens element 60 has a convex part 63 in the vicinity of the optical axis and a convex part 64' in a vicinity of its circular periphery as well as a concave part 65 between the two convex parts 63 and 64'. The optical data of the second example of the optical imaging lens set are shown in FIG. 20 while the aspheric surface data are shown in FIG. 21. The length of the optical imaging lens set is 5.444 mm. The image height is 3.085 mm. Some important ratios of the second example are as follows:

CT1=0.662
AC12=0.113
CT2=0.26
AC23=0.531
CT3=0.323
AC34=0.173
CT4=0.569
AC45=0.1
CT5=0.616
AC56=0.404
CT6=0.45
ALT=2.88
AAG=1.321
AAG/(AC34+AC45)=4.84
(AC12+AC56)/CT5=0.84
(AC12+AC56)/(AC34+AC45)=1.89
AC34/CT6=0.38
ALT/CT3=8.92
ALT/(AC12+AC56)=5.57
(AC23+AC45)/AC34=3.65
CT5/CT3=1.91
ALT/AAG=2.18
CT1/CT3=2.05

Third Example

Figure 5:
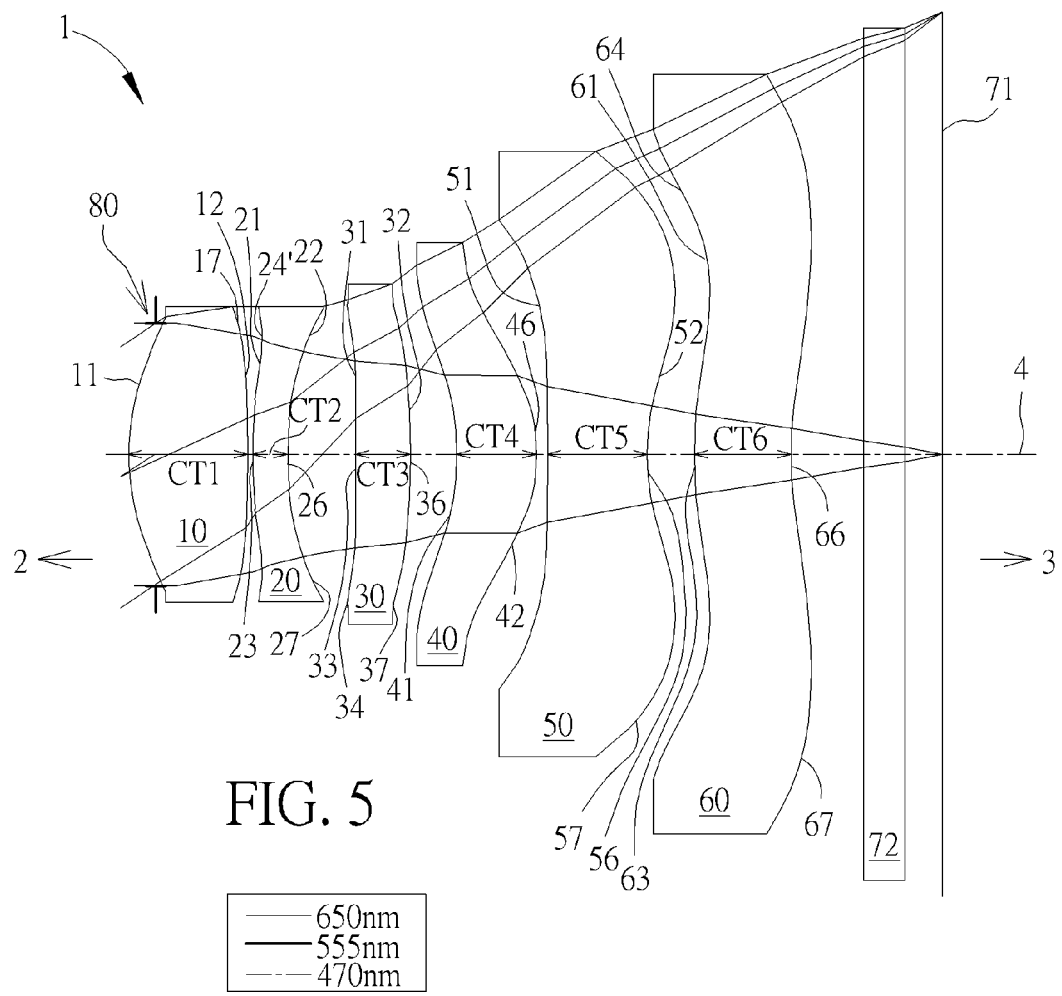
FIG. 5 illustrates a third example of the optical imaging lens set of six lens elements of the present invention.
Figures 6A, 6B, 6C, 6D:
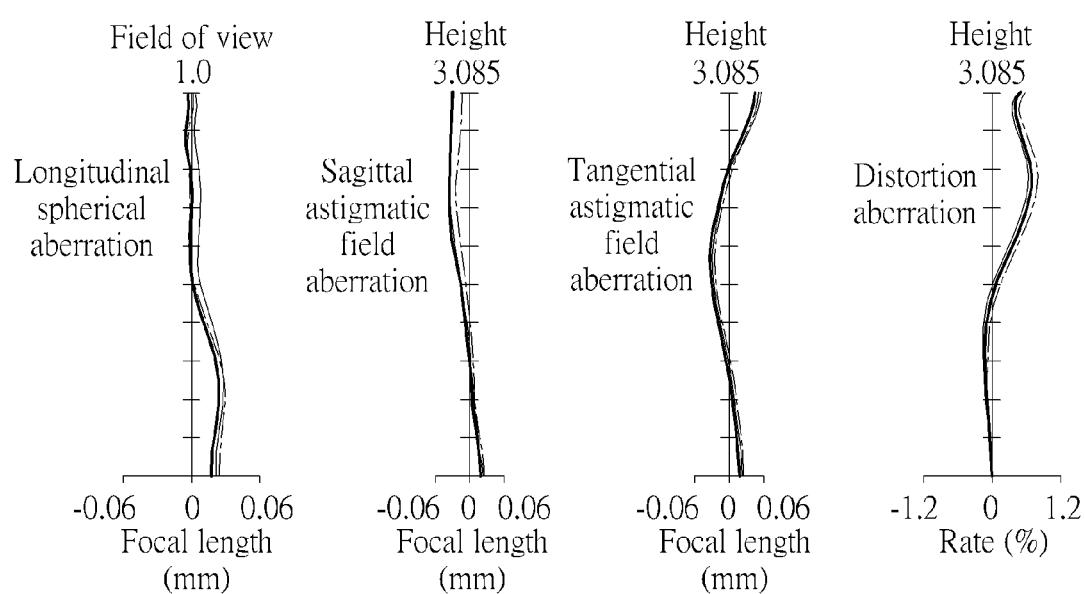
FIG. 6A illustrates the longitudinal spherical aberration on the image plane of the third example.
FIG. 6B illustrates the astigmatic aberration on the sagittal direction of the third example.
FIG. 6C illustrates the astigmatic aberration on the tangential direction of the third example.
FIG. 6D illustrates the distortion aberration of the third example.

Please refer to FIG. 5 which illustrates the third example of the optical imaging lens set 1 of the present invention. Please refer to FIG. 6A for the longitudinal spherical aberration on the image plane 71 of the third example; please refer to FIG. 6B for the astigmatic aberration on the sagittal direction; please refer to FIG. 6C for the astigmatic aberration on the tangential direction, and please refer to FIG. 6D for the distortion aberration. The components in the third example are similar to those in the first example, but the optical data such as the curvature radius, the refractive power, the lens thickness, the lens focal length, the aspheric surface or the back focal length in this example are different from the optical data in the first example, and in this example, the second object-side surface 21 of the second lens element 20 has a convex part 23 in the vicinity of the optical axis and a concave part 24' in a vicinity of its circular periphery; the third object-side surface 31 of the third lens element 30 has a concave part 33 in the vicinity of the optical axis and a convex part 34 in a vicinity of its circular periphery, the third image-side surface 32 of the third lens element 30 has a convex part 36 in the vicinity of the optical axis and a concave part 37 in a vicinity of its circular periphery; the fifth object-side surface 51 is a concave surface. The optical data of the third example of the optical imaging lens set are shown in FIG. 23 while the aspheric surface data are shown in FIG. 24. The length of the optical imaging lens set is 5.420 mm. The image height is 3.085 mm. Some important ratios of the third example are as follows:

CT1=0.826
AC12=0.037

CT2=0.229
AC23=0.39
CT3=0.373
AC34=0.327
CT4=0.559
AC45=0.086
CT5=0.686
AC56=0.177
CT6=0.676
ALT=3.349
AAG=1.017
AAG/(AC34+AC45)=2.46
  (AC12+AC56)/CT5=0.31
  (AC12+AC56)/(AC34+AC45)=0.52
AC34/CT6=0.48
ALT/CT3=8.98
ALT/(AC12+AC56)=15.65
  (AC23+AC45)/AC34=1.46
CT5/CT3=1.84
ALT/AAG=3.29
CT1/CT3=2.21

Fourth Example

Figure 7:
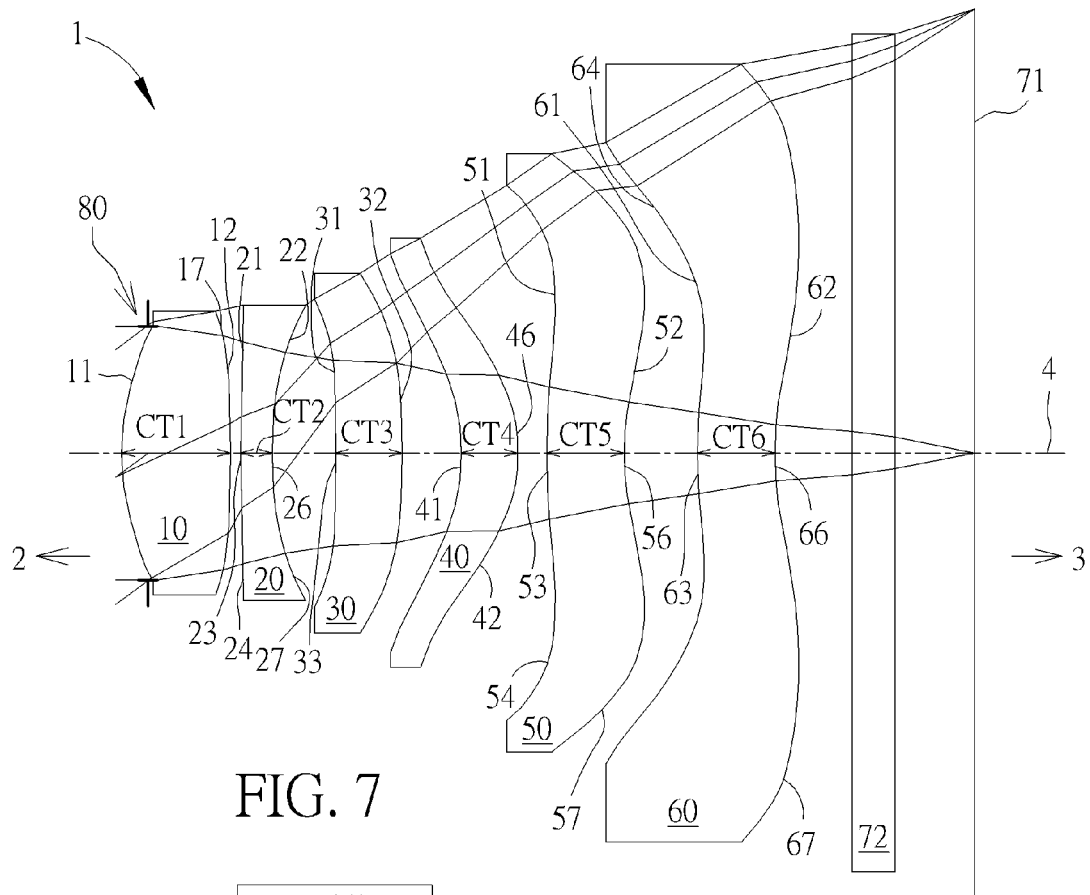
FIG. 7 illustrates a fourth example of the optical imaging lens set of six lens elements of the present invention.
Figures 8A, 8B, 8C, 8D:
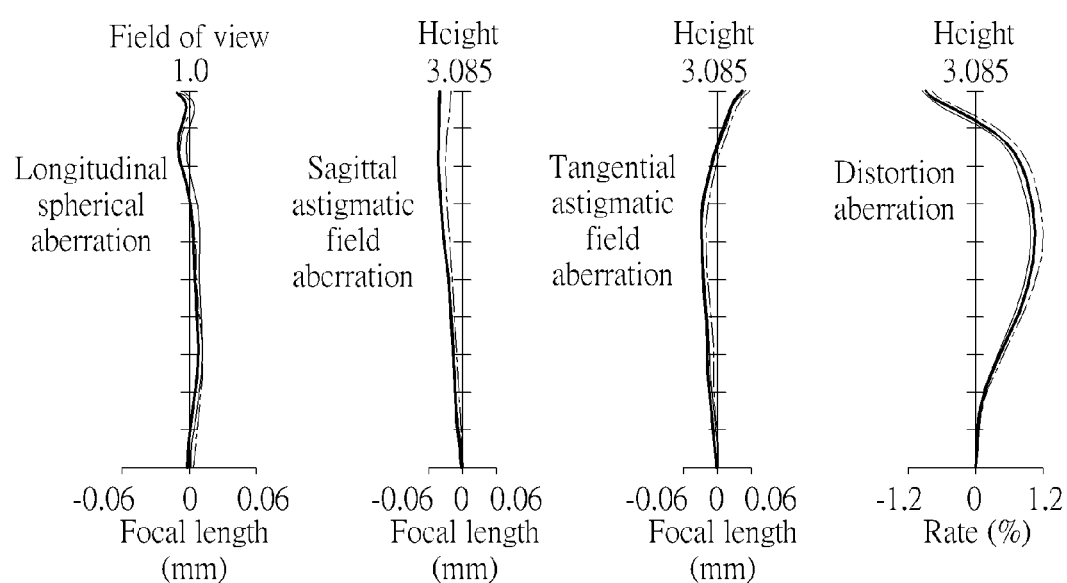
FIG. 8A illustrates the longitudinal spherical aberration on the image plane of the fourth example.
FIG. 8B illustrates the astigmatic aberration on the sagittal direction of the fourth example.
FIG. 8C illustrates the astigmatic aberration on the tangential direction of the fourth example.
FIG. 8D illustrates the distortion aberration of the fourth example.

Please refer to FIG. 7 which illustrates the fourth example of the optical imaging lens set 1 of the present invention. Please refer to FIG. 8A for the longitudinal spherical aberration on the image plane 71 of the fourth example; please refer to FIG. 8B for the astigmatic aberration on the sagittal direction; please refer to FIG. 8C for the astigmatic aberration on the tangential direction, and please refer to FIG. 8D for the distortion aberration. The components in the fourth example are similar to those in the first example, but the optical data such as the curvature radius, the refractive power, the lens thickness, the lens focal length, the aspheric surface or the back focal length in this example are different from the optical data in the first example, and in this example, the sixth lens element 60 with negative refractive power. The optical data of the fourth example of the optical imaging lens set are shown in FIG. 24 while the aspheric surface data are shown in FIG. 25. The length of the optical imaging lens set is 5.362 mm. The image height is 3.085 mm. Some important ratios of the fourth example are as follows:

CT1=0.748
AC12=0.081
CT2=0.208
AC23=0.442
CT3=0.46
AC34=0.413
CT4=0.393
AC45=0.206
CT5=0.535
AC56=0.28
CT6=0.534
ALT=2.878
AAG=1.422
AAG/(AC34+AC45)=2.3
  (AC12+AC56)/CT5=0.67
  (AC12+AC56)/(AC34+AC45)=0.58
AC34/CT6=0.77
ALT/CT3=6.26
ALT/(AC12+AC56)=7.97
  (AC23+AC45)/AC34=1.57
CT5/CT3=1.16
ALT/AAG=2.02
CT1/CT3=1.63

Fifth Example

Figure 9:
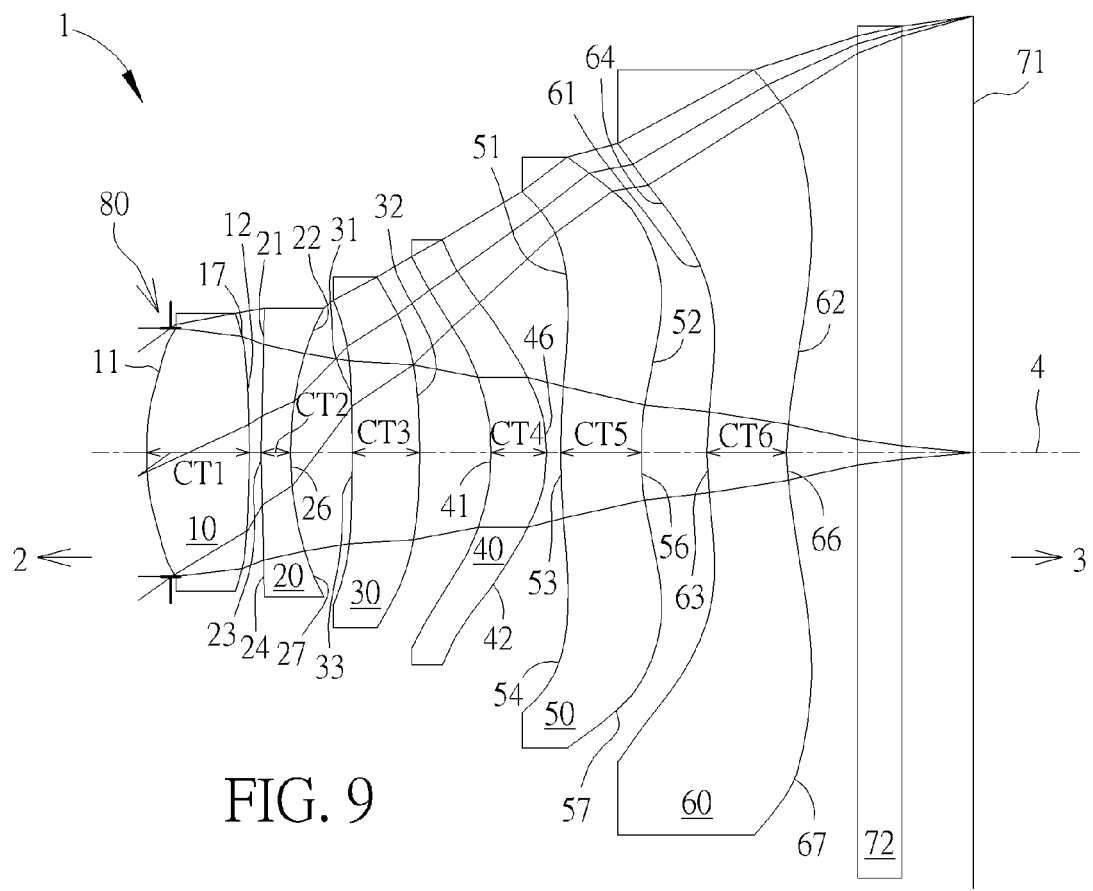
FIG. 9 illustrates a fifth example of the optical imaging lens set of six lens elements of the present invention.
Figures 10A, 10B, 10C, 10D:
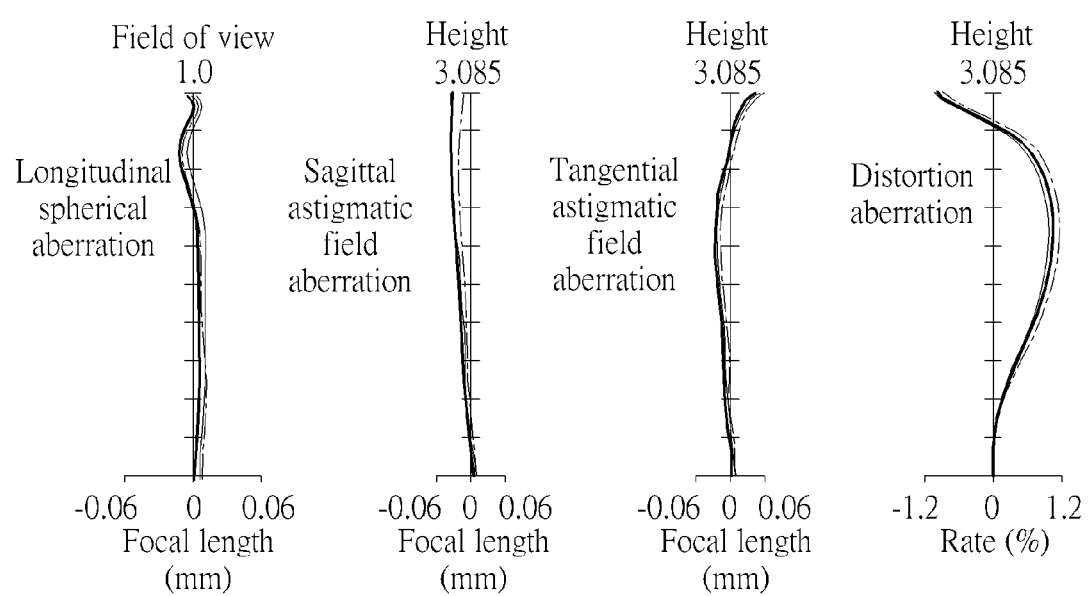
FIG. 10A illustrates the longitudinal spherical aberration on the image plane of the fifth example.
FIG. 10B illustrates the astigmatic aberration on the sagittal direction of the fifth example.
FIG. 10C illustrates the astigmatic aberration on the tangential direction of the fifth example.
FIG. 10D illustrates the distortion aberration of the fifth example.

Please refer to FIG. 9 which illustrates the fifth example of the optical imaging lens set 1 of the present invention. Please refer to FIG. 10A for the longitudinal spherical aberration on the image plane 71 of the fifth example; please refer to FIG. 10B for the astigmatic aberration on the sagittal direction; please refer to FIG. 10C for the astigmatic aberration on the tangential direction, and please refer to FIG. 10D for the distortion aberration. The components in the fifth example are similar to those in the first example, but the optical data such as the curvature radius, the refractive power, the lens thickness, the lens focal length, the aspheric surface or the back focal length in this example are different from the optical data in the first example, and in this example, the sixth lens element 60 with negative refractive power. The optical data of the fifth example of the optical imaging lens set are shown in FIG. 26 while the aspheric surface data are shown in FIG. 27. The length of the optical imaging lens set is 5.362 mm. The image height is 3.085 mm. Some important ratios of the fifth example are as follows:

CT1=0.727
AC12=0.088
CT2=0.208
AC23=0.423
CT3=0.479
AC34=0.503
CT4=0.392
AC45=0.105
CT5=0.567
AC56=0.286
CT6=0.557
ALT=2.93
AAG=1.405
AAG/(AC34+AC45)=2.31
  (AC12+AC56)/CT5=0.66
  (AC12+AC56)/(AC34+AC45)=0.62
AC34/CT6=0.9
ALT/CT3=6.12
ALT/(AC12+AC56)=7.83
  (AC23+AC45)/AC34=1.05
CT5/CT3=1.18
ALT/AAG=2.09
CT1/CT3=1.52

Sixth Example

Figure 11:
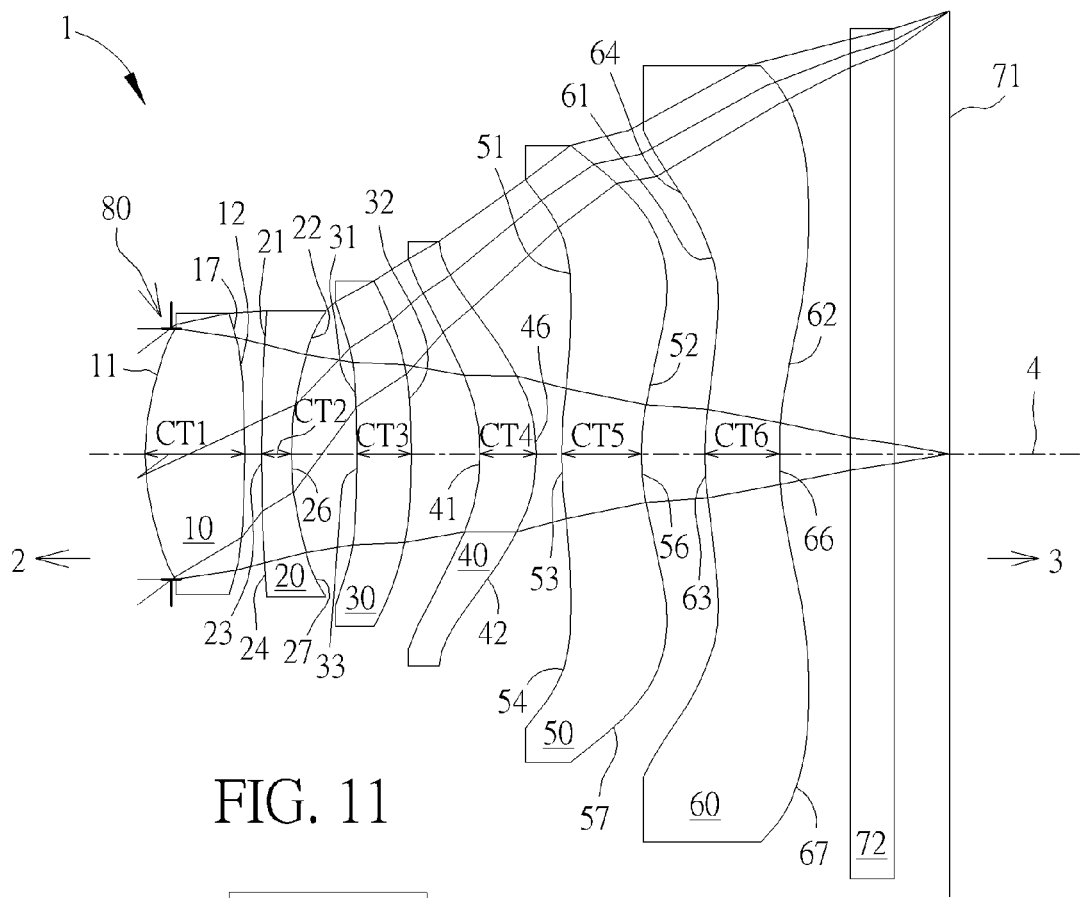
FIG. 11 illustrates a sixth example of the optical imaging lens set of six lens elements of the present invention.
Figures 12A, 12B, 12C, 12D:
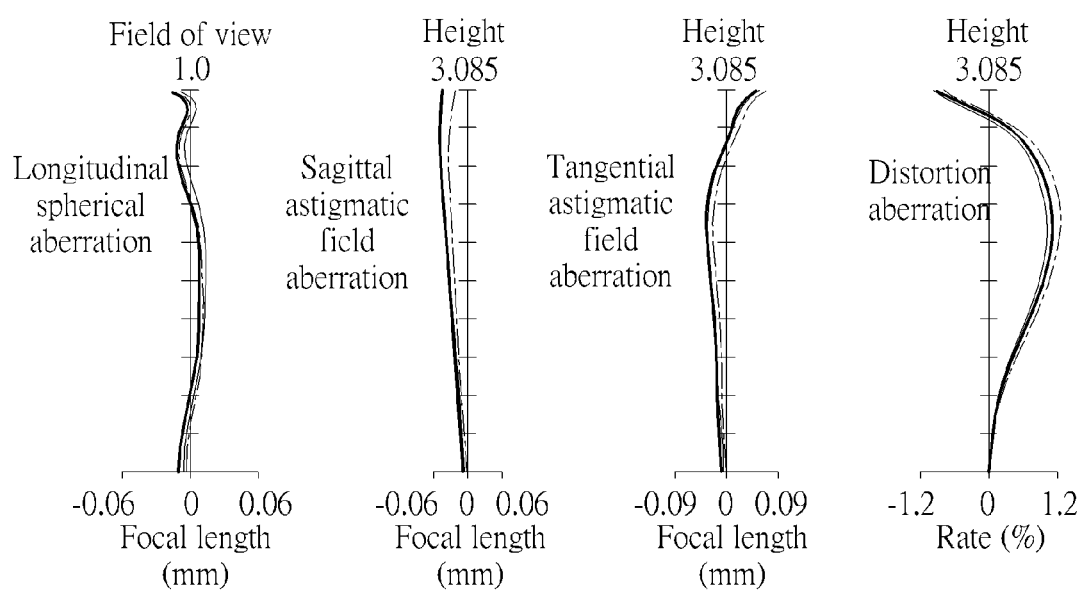
FIG. 12A illustrates the longitudinal spherical aberration on the image plane of the sixth example.
FIG. 12B illustrates the astigmatic aberration on the sagittal direction of the sixth example.
FIG. 12C illustrates the astigmatic aberration on the tangential direction of the sixth example.
FIG. 12D illustrates the distortion aberration of the sixth example.

Please refer to FIG. 11 which illustrates the sixth example of the optical imaging lens set 1 of the present invention. Please refer to FIG. 12A for the longitudinal spherical aberration on the image plane 71 of the sixth example; please refer to FIG. 12B for the astigmatic aberration on the sagittal direction; please refer to FIG. 12C for the astigmatic aberration on the tangential direction, and please refer to FIG. 12D for the distortion aberration. The components in the sixth example are similar to those in the first example, but the optical data such as the curvature radius, the refractive power, the lens thickness, the lens focal length, the aspheric surface or the back focal length in this example are different from the optical data in the first example, and in this example, the sixth lens element 60 with negative refractive power. The optical data of the sixth example of the optical imaging lens set are shown in FIG. 28 while the aspheric surface data are shown in FIG. 29. The length of the optical imaging lens set is 5.344 mm. The image height is 3.085 mm. Some important ratios of the sixth example are as follows:
CT1=0.696
AC12=0.084
CT2=0.207
AC23=0.459
CT3=0.381
AC34=0.49
CT4=0.399
AC45=0.195
CT5=0.557
AC56=0.162
CT6=0.521
ALT=2.761
AAG=1.39
AAG/(AC34+AC45)=2.03
(AC12+AC56)/CT5=0.44
(AC12+AC56)/(AC34+AC45)=0.36
AC34/CT6=0.94
ALT/CT3=7.25
ALT/(AC12+AC56)=11.22
(AC23+AC45)/AC34=1.33
CT5/CT3=1.46
ALT/AAG=1.99
CT1/CT3=1.83

Seventh Example

Figure 13:
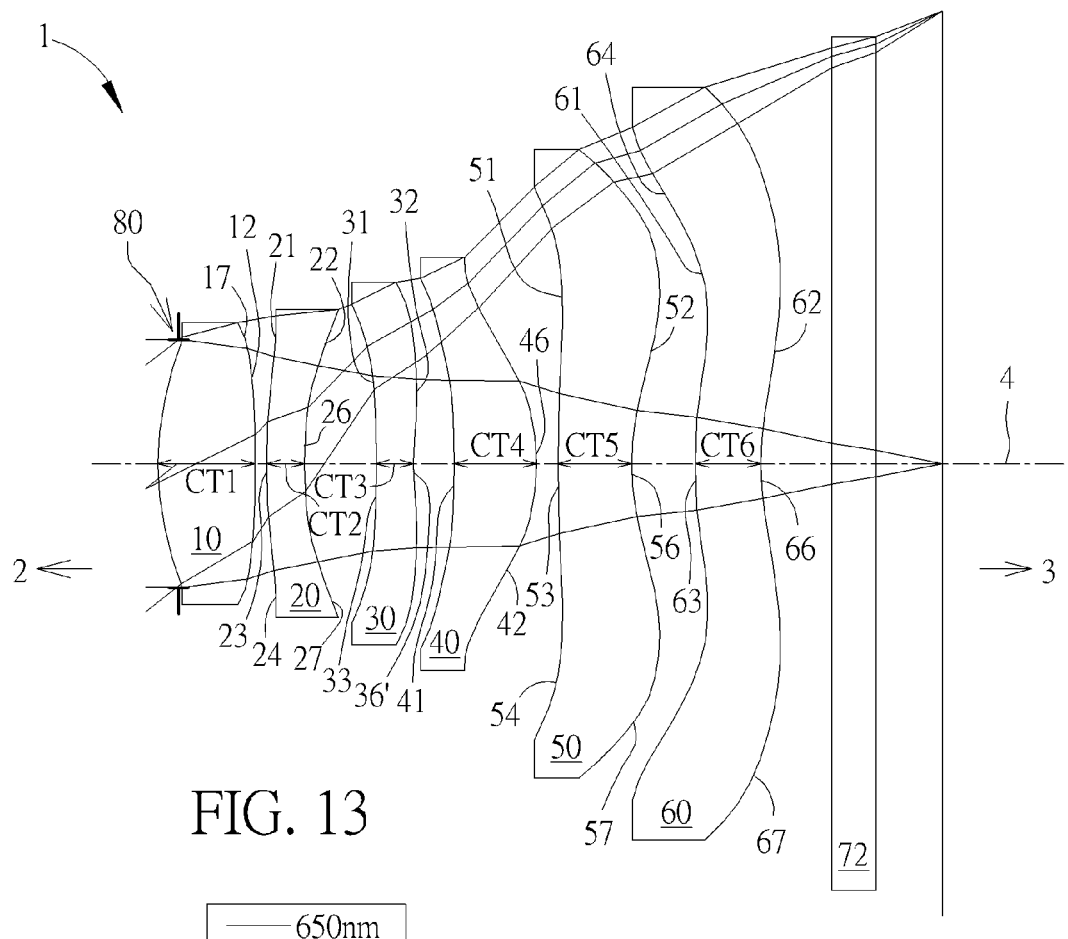
FIG. 13 illustrates a seventh example of the optical imaging lens set of six lens elements of the present invention.
Figures 14A, 14B, 14C, 14D:
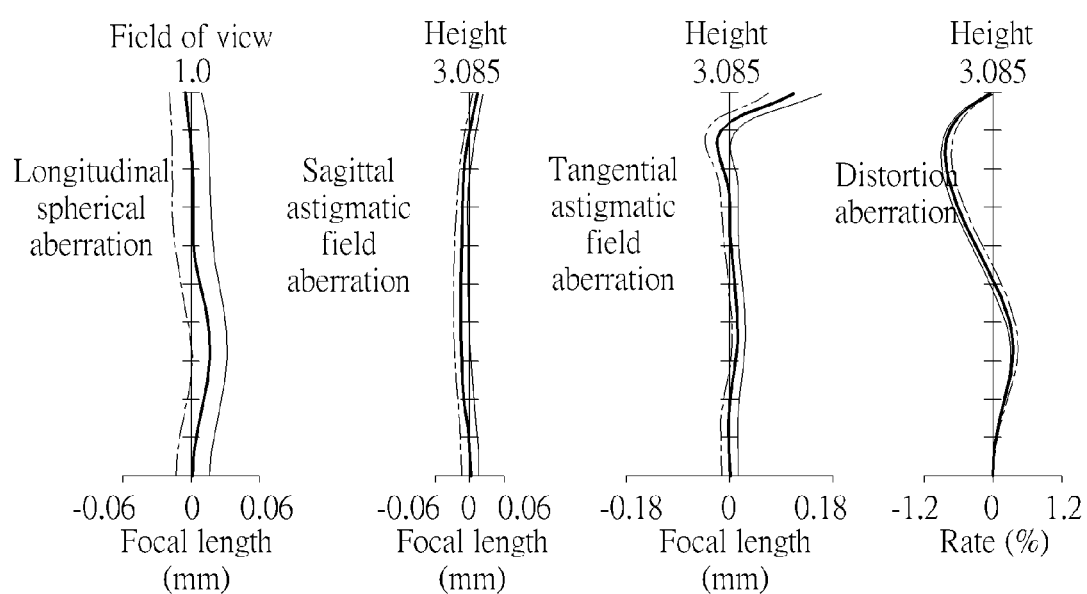
FIG. 14A illustrates the longitudinal spherical aberration on the image plane of the seventh example.
FIG. 14B illustrates the astigmatic aberration on the sagittal direction of the seventh example.
FIG. 14C illustrates the astigmatic aberration on the tangential direction of the seventh example.
FIG. 14D illustrates the distortion aberration of the seventh example.

Please refer to FIG. 13 which illustrates the seventh example of the optical imaging lens set 1 of the present invention. Please refer to FIG. 14A for the longitudinal spherical aberration on the image plane 71 of the seventh example; please refer to FIG. 14B for the astigmatic aberration on the sagittal direction; please refer to FIG. 14C for the astigmatic aberration on the tangential direction, and please refer to FIG. 14D for the distortion aberration. The components in the seventh example are similar to those in the first example, but the optical data such as the curvature radius, the refractive power, the lens thickness, the lens focal length, the aspheric surface or the back focal length in this example are different from the optical data in the first example, and in this example, the third lens element 30 and the sixth lens element 60 with negative refractive power; the third image-side surface 32 of the third lens element 30 has a concave part 36' in the vicinity of the optical axis. The optical data of the seventh example of the optical imaging lens set are shown in FIG. 30 while the aspheric surface data are shown in FIG. 31. The length of the optical imaging lens set is 5.151 mm. The image height is 3.085 mm. Some important ratios of the seventh example are as follows:
CT1=0.665
AC12=0.087
CT2=0.254
AC23=0.496
CT3=0.269
AC34=0.185
CT4=0.577
AC45=0.142
CT5=0.514
AC56=0.256
CT6=0.448
ALT=2.727
AAG=1.166
AAG/(AC34+AC45)=3.566
(AC12+AC56)/CT5=0.667
(AC12+AC56)/(AC34+AC45)=1.049
AC34/CT6=0.413
ALT/CT3=10.138
ALT/(AC12+AC56)=7.950
(AC23+AC45)/AC34=3.449
CT5/CT3=1.911
ALT/AAG=2.339
CT1/CT3=2.472

Some important ratios in each example are shown in FIG. 32.

In addition, the inventors discover that there are some better ratio ranges for different data according to the above various important ratios. Better ratio ranges help the designers to design the better optical performance and an effectively reduced length of a practically possible optical imaging lens set. For example:

(1) The first image-side surface has a convex part in a vicinity of its circular periphery; the second lens element has negative refractive power, the second image-side surface has a concave part in the vicinity of the optical axis; the third object-side surface has a concave part in the vicinity of the optical axis; the fourth image-side surface has a convex part in the vicinity of the optical axis; the fifth image-side surface has a concave part in the vicinity of the optical axis; the sixth image-side surface has a convex part in the vicinity of the optical axis; these lens elements and refractive powers are matched to each other, to ensure the image quality. In addition, the sixth lens element is made of plastic materials, the manufacturing process is easy and the plastic materials is lighter than other materials such as glass, to reduce the cost and lighten the weight of the optical imaging lens set. Besides, if the fifth lens element has negative refractive power, or the second object-side surface has a convex part in a vicinity of its circular periphery, or the second image-side surface has a concave part in a vicinity of its circular periphery, the aberration can be eliminated better.

(2) AAG/(AC34+AC45)≤5.60: If AAG is reduced, the total length of the optical imaging lens set can be shrunk, however, considering the light path and the image quality, parts of the air gap cannot be unlimitedly shrunk, in other words, AC34 and AC45 should be maintained larger, so that the incident light can be transmitted from the lens with smaller effective optical diameter to the lens with larger effective optical diameter, and the ratio of AAG/(AC34+AC45) will be limited by a maximum value. When the condition is satisfied, each of the air gaps has better arrangement and the optical imaging lens set has good image quality and shorter total length. Preferably, it is 2≤AAG/(AC34+AC45)≤5.6

(3) (AC12+AC56)/CT5≤1.50: Since the fifth lens element has larger effective optical diameter, the thickness shorten range is limited, (AC12+AC56)/CT5 is preferably small, but ideally, it is suggested that the range may be 0.3~1.5.

(4) (AC12+AC56)/(AC34+AC45)≤2.00: When the condition is satisfied, each of the air gaps has better arrangement and the optical imaging lens set has good image quality and shorter total length. Preferably, it is suggested that the range may be 0.3~2.0.

(5) AC34/CT6≤1.0: Since the sixth lens element has larger effective optical diameter, the thickness shorten range is limited, AC34/CT6 is preferably small, but ideally, it is suggested that the range may be 0.3~1.0.

(6) 6.00≤ALT/CT3: Since the third lens element has smaller effective optical diameter, the thickness shorten range is larger too, ALT/CT3 is preferably large, but ideally, it is suggested that the range may be 6.0~12.0.

(7) $4.50 \leq ALT/(AC12+AC56)$: Considering the difficulties in the manufacturing process, each lens element cannot be thinned unlimitedly, so that ALT cannot be reduced much, and the ratio is preferably large, ideally, it is suggested that the range may be 4.5~17.0.

(8) $0.95 \leq (AC23+AC45)/AC34$: Since the second image-side surface of the second lens element has a concave part in the vicinity of the optical axis, and the third object-side surface of the third lens element has a concave part in the vicinity of the optical axis, AC23 cannot be reduced much, and the ratio is preferably large, ideally, it is suggested that the range may be 0.95~4.0.

(9) $1.00 \leq CT5/CT3$: Since the effective optical diameter of the fifth lens element is larger so that the thickness of the fifth lens element can be made larger, and the effective optical diameter of the third lens element is smaller so that the thickness of the third lens element can be made smaller, therefore the ratio is preferably large, ideally, it is suggested that the range may be 1.0~2.1.

(10) $2.00 \leq ALT/AAG$: Considering the difficulties in the manufacturing process, each lens element cannot be thinned unlimitedly, so that ALT cannot be reduced much, the ratio is preferably large, ideally, it is suggested that the range may be 2.0~3.8.

(11) $1.30 \leq CT1/CT3$: Since the third object-side surface of the third lens element has a concave part in the vicinity of the optical axis, the reduction range of the third lens element is larger than the reduction range first lens element, and the ratio is preferably large, ideally, it is suggested that the range may be 1.3~2.5.

Figure 16:
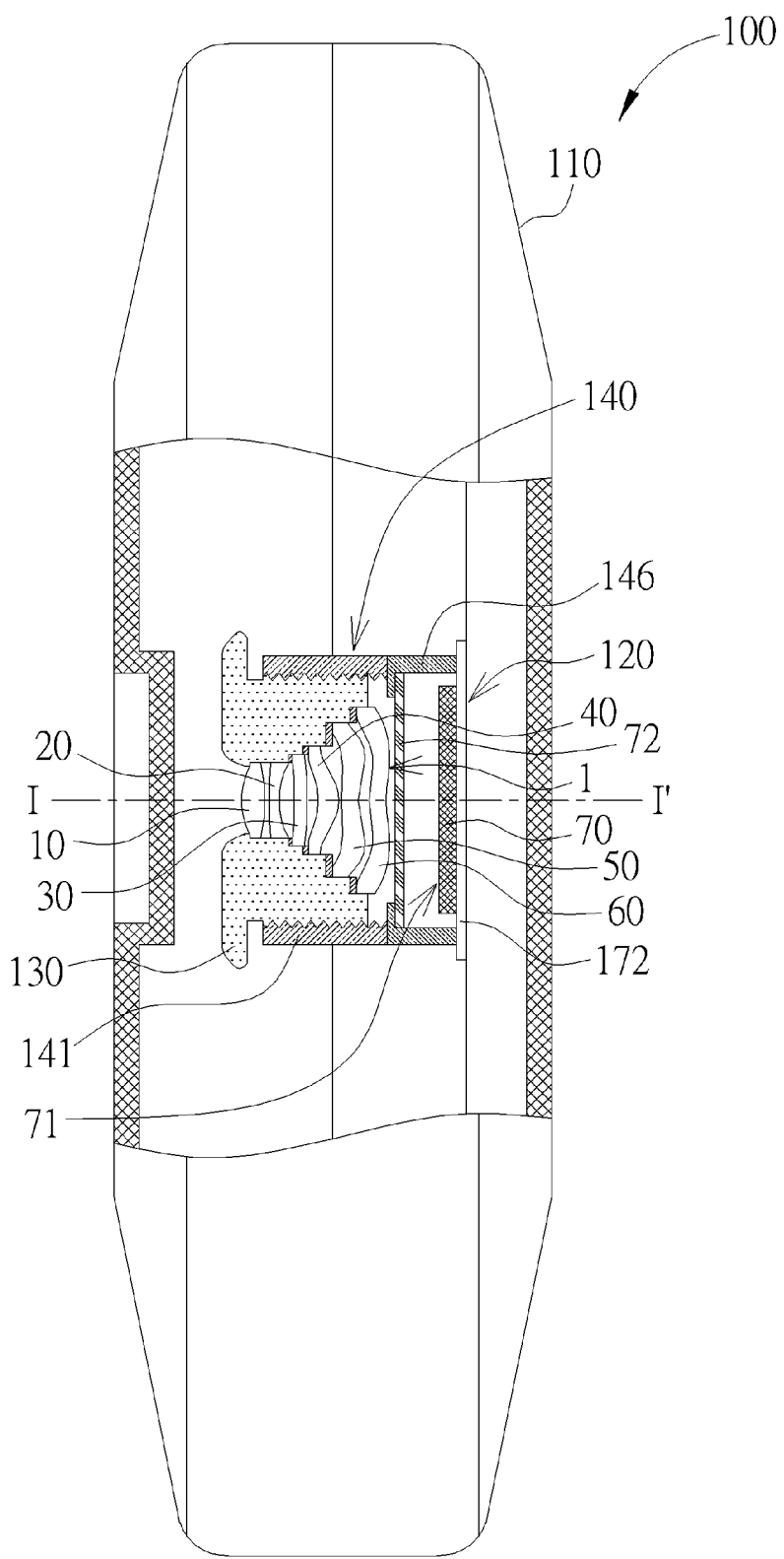
FIG. 16 illustrates a first preferred example of the portable electronic device with an optical imaging lens set of the present invention.

The optical imaging lens set 1 of the present invention may be applied to a portable electronic device. Please refer to FIG. 16. FIG. 16 illustrates a first preferred example of the optical imaging lens set 1 of the present invention for use in a portable electronic device 100. The portable electronic device 100 includes a case 110, and an image module 120 mounted in the case 110. A mobile phone is illustrated in FIG. 16 as an example, but the portable electronic device 100 is not limited to a mobile phone.

As shown in FIG. 16, the image module 120 includes the optical imaging lens set 1 as described above. FIG. 16 illustrates the aforementioned first example of the optical imaging lens set 1. In addition, the portable electronic device 100 also contains a barrel 130 for the installation of the optical imaging lens set 1, a module housing unit 140 for the installation of the barrel 130, a substrate 172 for the installation of the module housing unit 140 and an image sensor 70 disposed at the substrate 172, and at the image side 3 of the optical imaging lens set 1. The image sensor 70 in the optical imaging lens set 1 may be an electronic photosensitive element, such as a charge coupled device or a complementary metal oxide semiconductor element. The image plane 71 forms at the image sensor 70.

The image sensor 70 used here is a product of chip on board (COB) package rather than a product of the conventional chip scale package (CSP) so it is directly attached to the substrate 172, and protective glass is not needed in front of the image sensor 70 in the optical imaging lens set 1, but the present invention is not limited to this.

To be noticed in particular, the optional filter 72 may be omitted in other examples although the optional filter 72 is present in this example. The case 110, the barrel 130, and/or the module housing unit 140 may be a single element or consist of a plurality of elements, but the present invention is not limited to this.

Each one of the six lens elements 10, 20, 30, 40, 50 and 60 with refractive power is installed in the barrel 130 with air gaps disposed between two adjacent lens elements in an exemplary way. The module housing unit 140 has a lens element housing 141, and an image sensor housing 146 installed between the lens element housing 141 and the image sensor 70. However in other examples, the image sensor housing 146 is optional. The barrel 130 is installed coaxially along with the lens element housing 141 along the axis I-I', and the barrel 130 is provided inside of the lens element housing 141.

Because the optical imaging lens set 1 of the present invention may be as short as 5.15~5.44 mm, this ideal length allows the dimensions and the size of the portable electronic device 100 to be smaller and lighter, but excellent optical performance and image quality are still possible. In such a way, the various examples of the present invention satisfy the need for economic benefits of using less raw materials in addition to satisfy the trend for a smaller and lighter product design and consumers' demands.

Figure 17:
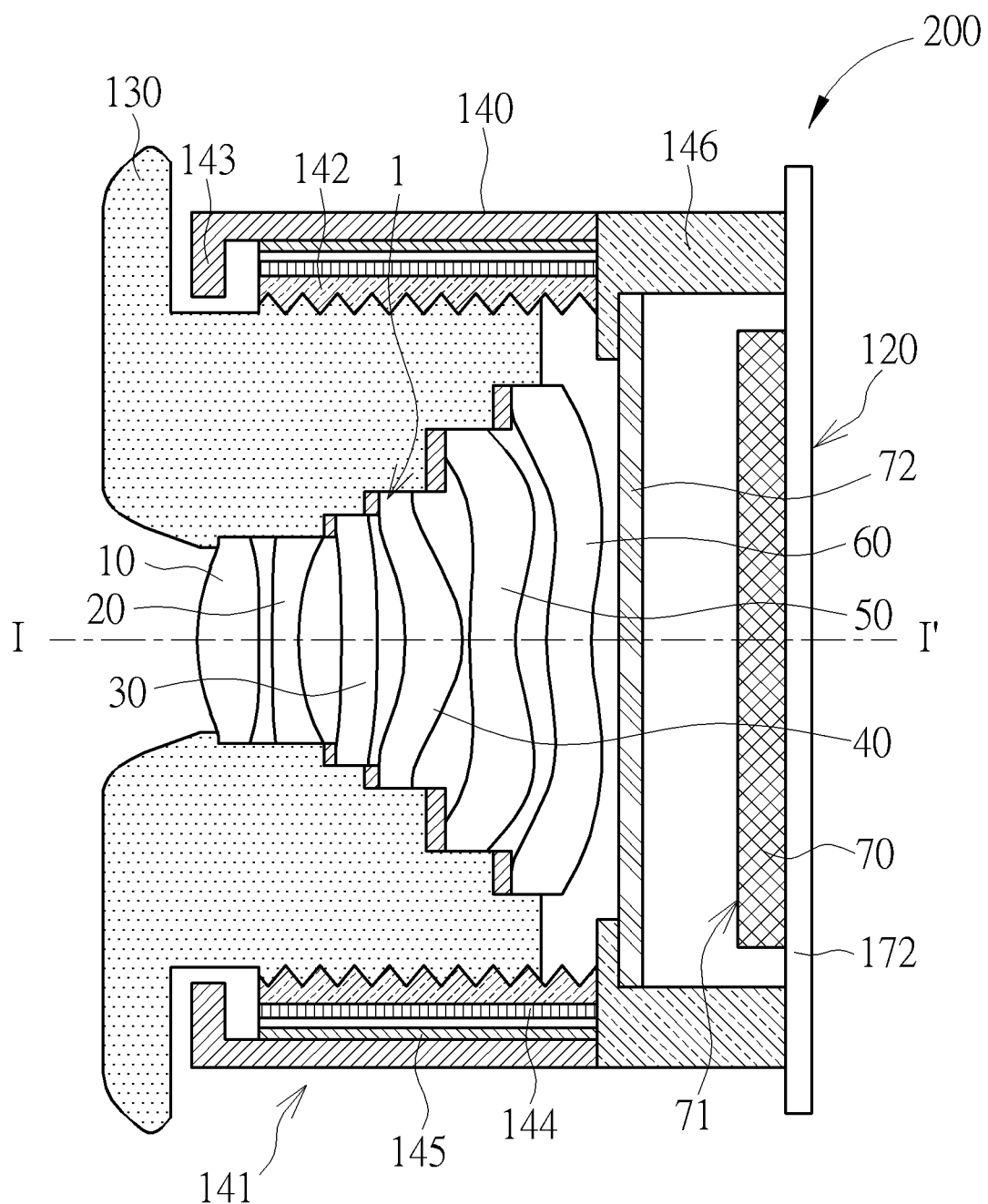
FIG. 17 illustrates a second preferred example of the portable electronic device with an optical imaging lens set of the present invention.

Please also refer to FIG. 17 for another application of the aforementioned optical imaging lens set 1 in a portable electronic device 200 in the second preferred example. The main differences between the portable electronic device 200 in the second preferred example and the portable electronic device 100 in the first preferred example are: the lens element housing 141 has a first seat element 142, a second seat element 143, a coil 144 and a magnetic component 145. The first seat element 142 is for the installation of the barrel 130, exteriorly attached to the barrel 130 and disposed along the axis I-I'. The second seat element 143 is disposed along the axis I-I' and surrounds the exterior of the first seat element 142. The coil 144 is provided between the outside of the first seat element 142 and the inside of the second seat element 143. The magnetic component 145 is disposed between the outside of the coil 144 and the inside of the second seat element 143.

The first seat element 142 may pull the barrel 130 and the optical imaging lens set 1 which is disposed inside of the barrel 130 to move along the axis I-I', namely the optical axis 4 in FIG. 1. The image sensor housing 146 is attached to the second seat element 143. The optical filter 72, such as an infrared filter, is installed at the image sensor housing 146. Other details of the portable electronic device 200 in the second preferred example are similar to those of the portable electronic device 100 in the first preferred example so they are not elaborated again.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical imaging lens set, from an object side toward an image side in order along an optical axis comprising: a first lens element, a second lens element, a third lens element, a fourth lens element, a fifth lens element and a sixth lens element, each of the first lens element, the second lens element, the third lens element, the fourth lens element, the fifth lens element and the sixth lens element having refractive power, an object-side surface facing toward the object side as well as an image-side surface facing toward the image side, wherein:

the first lens element has an image-side surface with a convex part in a vicinity of its periphery;

the second lens element with negative refractive power has an object-side surface with a convex part in a vicinity of the optical axis, and an image-side surface with a concave part in a vicinity of the optical axis and a concave part in a vicinity of its periphery;

the third lens element has an object-side surface with a concave part in a vicinity of the optical axis;

the fourth lens element has an image-side surface with a convex part in a vicinity of the optical axis;

the fifth lens element has an image-side surface with a concave part in a vicinity of the optical axis;

the sixth lens element being made of plastic, has an image-side surface with a concave part in a vicinity of the optical axis and a convex part in a vicinity of its periphery; and the optical imaging lens set not including any lens element with refractive power other than said first lens element, second lens element, third lens element, fourth lens element, fifth lens element and sixth lens element, in addition, an air gap AC12 between said first lens element and said second lens element along said optical axis, an air gap AC56 between said fifth lens element and said sixth lens element along said optical axis, and a total thickness ALT of said first lens element, said second lens element, said third lens element, said fourth lens element, said fifth lens element and said sixth lens element along said optical axis satisfy a relationship $$4.50 \leq \frac{ALT}{AC12 + AC56} \leq 17.00.$$

2. The optical imaging lens set of claim 1, wherein an air gap AC34 between said third lens element and said fourth lens element along said optical axis, an air gap AG45 between said fourth lens element and said fifth lens element along said optical axis, and a sum of all five air gaps AAG between each lens element from said first lens element to said sixth lens element along the optical axis satisfy a relationship $$\frac{AAG}{AC34 + AC45} \leq 5.6.$$

3. The optical imaging lens set of claim 2, wherein a thickness CT5 of said fifth lens element along said optical axis satisfies a relationship $$\frac{AC12 + AC56}{CT5} \leq 1.50.$$

4. The optical imaging lens set of claim 2, wherein the fifth lens element has negative refractive power.

5. The optical imaging lens set of claim 1, wherein an air gap AC34 between said third lens element and said fourth lens element along said optical axis, and an air gap AG45 between said fourth lens element satisfy a relationship $$\frac{AC12 + AC56}{AC34 + AC45} \leq 2.00.$$

6. The optical imaging lens set of claim 5, wherein a thickness CT6 of said sixth lens element along said optical axis and AC34 satisfy a relationship $$\frac{AC34}{CT6} \leq 1.00.$$

7. The optical imaging lens set of claim 6, wherein a thickness CT3 of said third lens element along said optical axis satisfies a relationship $$6.00 \leq \frac{ALT}{CT3} \leq 12.00.$$

8. The optical imaging lens set of claim 1, wherein an air gap AC23 between said second lens element and said third lens element along said optical axis, an air gap AC34 between said third lens element and said fourth lens element along said optical axis, and an air gap AG45 between said fourth lens element and said fifth lens element along said optical axis satisfy a relationship $$0.95 \leq \frac{AC23 + AC45}{AC34} \leq 4.00.$$

9. The optical imaging lens set of claim 8, wherein a thickness CT3 of said third lens element along said optical axis, and a thickness CT5 of said fifth lens element along said optical axis satisfy a relationship $$1 \leq \frac{CT5}{CT3} \leq 2.10.$$

10. The optical imaging lens set of claim 1, wherein a sum of all five air gaps AAG between each lens element from said first lens element to said sixth lens element along the optical axis satisfies a relationship $$2.00 \leq \frac{ALT}{AAG} \leq 3.80.$$

11. The optical imaging lens set of claim 10, wherein a thickness CT1 of said first lens element along said optical axis, and a thickness CT3 of said third lens element along said optical axis satisfy a relationship $$1.30 \leq \frac{CT1}{CT3} \leq 2.50.$$

12. The optical imaging lens set of claim 1, wherein the object-side surface of the second lens element further comprises a convex part in a vicinity of its periphery.

13. An electronic device, comprising:
a case; and
an image module disposed in said case and comprising:
  an optical imaging lens set of claim 1;
  a barrel for the installation of said optical imaging lens set;
  a module housing unit for the installation of said barrel;
  a substrate for the installation of said module housing unit; and
  an image sensor disposed on the substrate and disposed at an image side of said optical imaging lens set.

* * * * *